US 6,577,793 B2

(12) United States Patent
Vaganov

(10) Patent No.: US 6,577,793 B2
(45) Date of Patent: Jun. 10, 2003

(54) OPTICAL SWITCH

(75) Inventor: Vladimir I. Vaganov, Los Gatos, CA (US)

(73) Assignee: MegaSense, Inc., Los Gatos, CA (US)

( * ) Notice: Subject to any disclaimer, the term of this patent is extended or adjusted under 35 U.S.C. 154(b) by 140 days.

(21) Appl. No.: 09/893,308

(22) Filed: Jun. 27, 2001

(65) Prior Publication Data

US 2002/0181843 A1 Dec. 5, 2002

Related U.S. Application Data

(60) Provisional application No. 60/214,837, filed on Jun. 28, 2000.

(51) Int. Cl.[7] .............................. G02B 6/42; G02B 6/26
(52) U.S. Cl. .............................. 385/52; 385/16; 385/31; 385/32; 385/17
(58) Field of Search .............................. 385/16, 17, 18, 385/31, 32, 33, 38, 42, 47, 50, 52, 15

(56) References Cited

U.S. PATENT DOCUMENTS 4,475,033 A * 10/1984 Willemsen et al. ...... 250/201.1
5,926,594 A * 7/1999 Song et al. ............... 385/49

* cited by examiner

Primary Examiner—James Phan
Assistant Examiner—Joshua Pritchett
(74) Attorney, Agent, or Firm—U. P. Peter Eng; Wilson Sonsini Goodrich Rosati

(57) ABSTRACT

An optical switch includes a plurality of transmitting devices with a plurality of optical fibers that each have a distal end. A plurality of focusing devices are included. Each distal end of a fiber is coupled to at least one focusing device. A plurality of receiving devices are provided. At least a portion of the distal ends of the optical fibers move in three orthogonal and at least two angular dimensions to direct output beams from the plurality of transmitting devices to the plurality of receiving devices.

68 Claims, 22 Drawing Sheets

OPTICAL SWITCH

CROSS-REFERENCE TO RELATED APPLICATIONS

This application claims benefit of Ser. No. 60/214,837 filed Jun. 28, 2000, which application is fully incorporated herein as if set forth in its entirety.

BACKGROUND OF THE INVENTION

1. Field of the Invention

This invention relates generally to optical communications, and more particularly to all-optical switching of fiber networks.

2. Description of the Related Art

A critical technology in enhancing speed and bandwidth in communication systems is All-Optical switching, a primary goal of the telecommunication industry. Optical cross-connects are the enabling devices for the planned all-optical communication networks. They connect high-capacity fiber optic communication links coming into a particular hub with any of hundreds of outgoing channels. In doing so they solve two major problems. First, they provide controlled connections among numerous intermediate links to create a continuous optical pathway between endpoints anywhere in the network, optimizing the stream of data and reducing the cost of service. Secondly, they protect the network in the event of catastrophic failure of an intermediate link by instantaneously re-routing a circuit. An all-optical network will be easier to manage and more reliable while reducing the cost of bandwidth.

There are several types of All-Optical switches known in the art. The classification of optical switches is presented in FIG. 1. Among them there are switches based on light birefringence phenomenon, switches utilizing light polarization in liquid crystals, switches utilizing bubbles in capillaries, electromechanical switches, and mirror-based switches.

Many 1×N switch architectures are based on a combination of two-state gates in a tree like structures. For N input channels N similar structures are required. It is clear that N×N switch requires $N^2$ gates. Moreover, in such a switch each of N output channels requires additional couplers and therefore increases both cost and optical losses in this switch architecture.

The operation of birefringent switches, typically based on lithium niobate or titanium niobate crystals, is polarization sensitive, and thus these switches require polarization-preserving optical fibers, and also require careful input/output waveguide mode matching in the optical system. Lithium niobate based switches have relatively large insertion loss and provide only a moderate degree of channel isolation. Besides, such switches require complicated fabricating processes. Examples of such switches can be found in the U.S. Pat. Nos. 4,976,505 and 5,946,116.

Liquid Crystal Optical Switches offer relatively high on/off ratios and relatively low optical insertion losses. But they require polarized light. Additionally, liquid crystal switches have certain environmental limitations including limited operating temperature range and environmental degradation. It is generally agreed upon that the technology lends itself only for small-size switching arrays. Examples of such switches can be found in publication Bawa et al., "Miniaturized total-reflection ferroelectric liquid-crystal electro-optic switch," Appl. Phys. Lett., vol. 57, No. 15, pp. 1479–1481, Oct. 8, 1990 and in the U.S. Pat. No. 5,132,822.

Another architecture, based on waveguides and gas bubbles in fluid media, is described in the U.S. Pat. No. 6,055,344. At each switching point an input waveguide intersects an output waveguide at a fluid-filled trench. If the intersection is filled by liquid then the light passes straight through the intersection. When a gas bubble is placed in the intersection then light reflects to the output waveguide. It is obvious that an N×N channel switch also requires $N^2$ gates. Gas bubble based switches have certain environmental limitations including operating temperature range and environmental degradation. Insertion loss for such switches greatly depends on optical path and can vary many times within one switch. A similar architecture, based on waveguides and mirrors, is described in the U.S. Pat. No. 5,960,132.

Optical switch utilizing thermo-optical attenuators as the gates is described in "Silica-based optical-matrix switch with intersecting Mach-Zehnder waveguides for larger fabrication tolerances" by M. Kawachi et al, Conference OFC/IOOC '93, Feb. 21–26, 1993, San Jose, Calif. (U.S.A.), paper TuH4. Each input guide splits on two guides. After splitting each guide will have a gate, which can either open or close the guide. It can be shown that the total number of required gates for an N×N switch is $2N^2$.

Another technology is based on a sliding mirror between two or three fibers, which can potentially be used as a variable optical attenuator or as an optical switch in small-size switching arrays. See U.S. Pat. No. 6,031,946.

Another group of optical switches utilizes multi-state switching elements. One of the great advantages of open space architecture is that the light beams can physically cross each other without interference of the signals transmitted by both beams. The light beams carrying information are transparent to each other. This is a unique property of light, which allows building switches with absolutely different architecture not possible in the electrical wire world.

The majority of current open space optical switching technologies are based on MEMS micro-mirrors. Schematically this principle is shown in FIG. 2 The light beams 10 from the input fibers 12 are focused with collimators 14 on the first set of mirrors 16, where they are redirected, as shown in 18, onto a second set of mirrors 20, which in their turn are redirecting the beams 22 into required output collimators 24 and then to the fibers 26. N×N optical switch based on this architecture requires 2N mirrors. Optical attenuation is in the range of 5 to 10 dB and they require at least two major optical alignments: between the transmitting array and the first mirror array and between the second mirror array and the receiving array. This architecture is complicated mechanically, optically and electronically.

Some of these MEMS micro-mirror arrays are based on surface micromachining technology. These devices have few disadvantages. The reported switching time is relatively slow. The optical losses are high. A large portion of these losses is inherent to this technology. For example, a non-flatness of the mirror is one of the sources of optical losses.

Other technologies use micro-mirrors based on bulk silicon micromachining. Bulk micro-machined mirrors with Gimbals suspension are inherently extremely fragile due to the relatively large mass of the mirrors, which are suspended by very thin beams. This results in low yield, high cost, and low reliability. See U.S. Pat. No. 5,629,790 incorporated fully herein by reference.

In another approach the switching or channel selection is achieved by means of a prism. Optical losses are moderate but the architecture and structure of the switch is complicated. See U.S. Pat. Nos. 5,999,669 and 6,005,993.

Another approach of redirecting the light beams between the transmitting and receiving arrays is based on lateral movement of the micro-lenses in front of collimators. However, it requires large space around the lens and the efficiency of the real estate utilization in the array is very low. See, for example: H. Toshiyoshi, Guo-Dung J. Su, J. LaCosse, M. C. Wu, "Microlens 2D Scanners for Fiber Optic Switches", Proc. $3^{rd}$ Int'l Conf. On Micro Opto Electro Mechanical Systems (MOEMS99), Aug. 30-Sep. 1, 1999, Mainz, Germany, pp. 165–167.

In electromechanical optical switches the input optical fibers are moving relative to the output optical fibers. Electromechanical switches don't require mirrors and therefore, don't require corresponding optical alignments and have smaller optical losses. However, macro actuators, for example step motors, are usually used in electromechanical switches as actuators. As an alignment of the fibers is critical in such systems, providing this precise and reproducible alignment with the motors is a big challenge. Another limitation of the electromechanical switches is that it is difficult to move simultaneously and independently more than one input fiber with respect to N output fibers. Besides, actuators used in these optical switches typically have only one degree of freedom, i.e. they allow circular motion of the fiber. Although these switches historically appeared first, they are usually 1×N switches, mechanically complicated, unreliable and slow. Examples of electromechanical optical switches are described in U.S. Pat. Nos. 4,378,144, 5,920,665.

Another optical switch is described in U.S. Pat. No. 4,512,036. In this switch, the end of the fiber is bent in two dimensions relative to a lens, which focuses the beam to a receiving lens. Piezoelectric actuators perform the bending of the fiber. Besides being costly, the dimensions of these beam steering units affect the overall size of the optical switch. As piezoelectric actuators have certain limitations in the displacement, this type of switch can be used only for relatively low port-count. The main disadvantage of this switch is that it is trying to combine different incompatible technologies in one device. They can not be integrated in one batch fabricating process. As a result, the technology of assembling is very complex, performance and reliability are low and expected cost is large.

An enabling development for all-optical systems is the concept of Optical MEMS. An acronym for Micro-Electro-Mechanical Systems, MEMS is a term used to describe a concept—Microsystems that monolithically integrate microstructures, sensors, actuators or optical components, like mirrors, lenses, couplers, etc., with associated mechanical, optical and electronic functions. MEMS are now used throughout the world in an ever-expanding range of applications in automotive, industrial and consumer products. Communication technology and specifically optical communication will be revolutionized with Optical MEMS. One of Optical MEMS switches is disclosed in this patent application.

There is a need for an optical switch with a larger number of switching channels that have the same optical loss. There is a further need for an optical switch with smaller optical loss in each switching channel.

SUMMARY

Accordingly, an object of the present invention is to provide an optical switch with a larger number of switching channels with the same optical loss.

Another object of the present invention is to provide an optical switch with smaller optical loss in each switching channel.

Yet another object of the present invention is to provide an optical switch with faster switching.

Still another object of the present invention is to provide an optical switch with lower cost of switching per channel.

Yet another object of the present invention is to provide an optical switch that has higher reliability.

A further object of the present invention is to provide an optical switch with lower sensitivity to vibrations.

Another object of the present invention is to provide an optical switch with lower temperature sensitivity of optical switching.

A further object of the present invention is to provide a smaller size optical switch.

Yet another object of the present invention is to provide an optical switch with a simpler architecture. Another object of the present invention is to provide an optical switch with an improved movable microstructure.

Yet a further object of the present invention is to provide an optical switch with a more effective actuator of movable microstructure.

Another object of the present invention is to provide an optical switch that has higher sensitivity sensors for a closed loop control system.

Yet another object of the present invention is to provide a multi-position open loop control system for an optical switch.

A further object of the present invention is to provide a higher level of integration of different components for an optical switch.

Still another object of the present invention is to provide a higher level of integration of different MEMS, electronic and micro-optical components of an optical switch.

Yet another object of the present invention is to provide optical switch with fewer components.

Another object of the present invention is to provide an optical switch that has less optical alignments of components.

These and other objects of the present invention are achieved in an optical switch that includes a plurality of transmitting devices with a plurality of optical fibers that each have a distal end. A plurality of focusing devices are included. Each distal end of a fiber is coupled to at least one focusing device. A plurality of receiving devices are provided. At least a portion of the distal ends of the optical fibers move in three orthogonal and at least two angular dimensions to direct output beams from the plurality of transmitting devices to the plurality of receiving devices.

In another embodiment of the present invention, a method for optical switching between input fiber channels output fiber channels provides a plurality of transmitting devices including a plurality of optical fibers and a plurality of receiving devices including a plurality of optical fibers. Moving at least a portion of the distal ends of the optical fibers in three orthogonal and at least two angular dimensions to direct output beams from the plurality of transmitting devices to the plurality of receiving devices.

DESCRIPTION OF THE PREFERRED EMBODIMENTS

Figure 3:
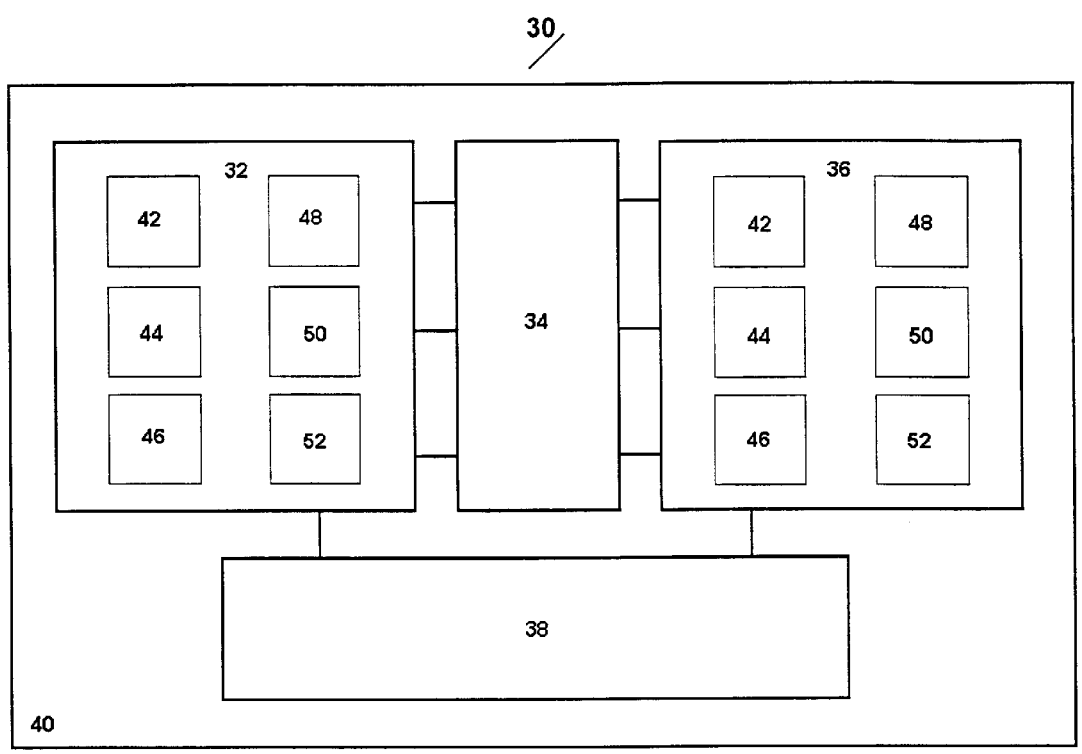
FIG. 3 is a schematic diagram of one embodiment of an optical switch of the present invention.

FIG. 3 illustrates one embodiment of an optical switch 30 of the present invention. The FIG. 3 embodiment includes five major components, a transmitting unit, hereafter a "transmitting array" 32, an optical transparent media 34, a receiving unit, hereafter a "receiving array" 36, a control system 38 and a packaging 40. Transmitting and receiving arrays 32 and 36 each include an optical body 42, a fiber connector 44, a cavity 46, a lens 48, a focusing device 50 and a transmitting directing device 54.

Figure 4:
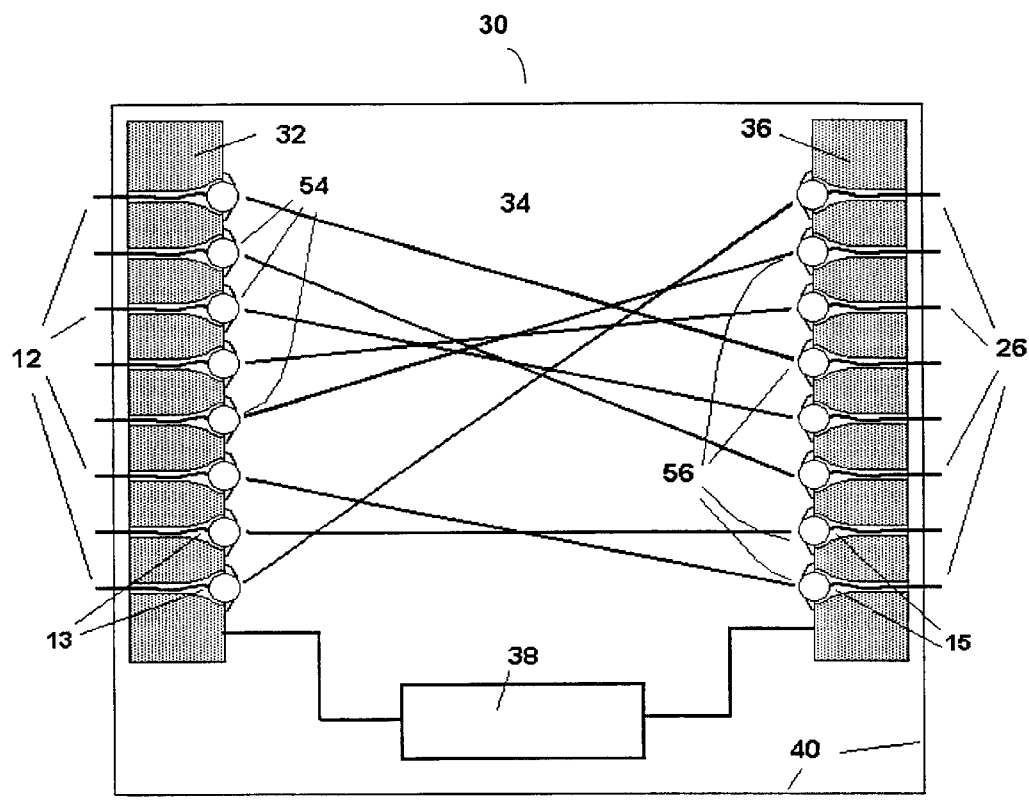
FIG. 4 is a schematic diagram illustrating the architecture of one embodiment of an optical switch of the present invention.
Figure 5:
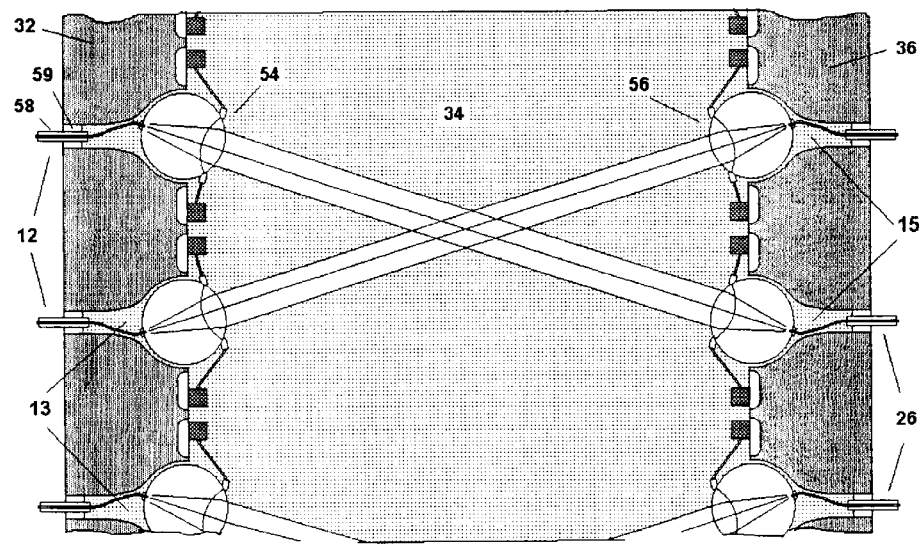
FIG. 5 illustrates an enlarged portion of the FIG. 4 optical switch.

FIGS. 4 and 5 illustrate one embodiment of architecture of optical switch 30. Included is transmitting array 32 with transmitting directing devices 54 and incoming fibers 12. Light beams from transmitting directing devices 54 travel through optical transparent media 34 to receiving devices 56, which are mounted in receiving array 36. Receiving devices 56 focus the light into output fibers 26. Transmitting and receiving arrays 32 and 36 are controlled with control circuit 38. In one embodiment, each element of optical switch 30 is included in package 40.

In one embodiment of the present invention, the entire optical switch 30 can be micro-packaged to include transmitting array 32, optical transparent media 34, receiving array 36, control system 38 as well as the fiber connectors at the input and out. The present invention utilizes MEMS based technology and packaging to achieve full integration of all or a portion of the optical, electronic and mechanical components of optical switch into one system fabricated that is fabricated in one integrated process.

Figure 6:
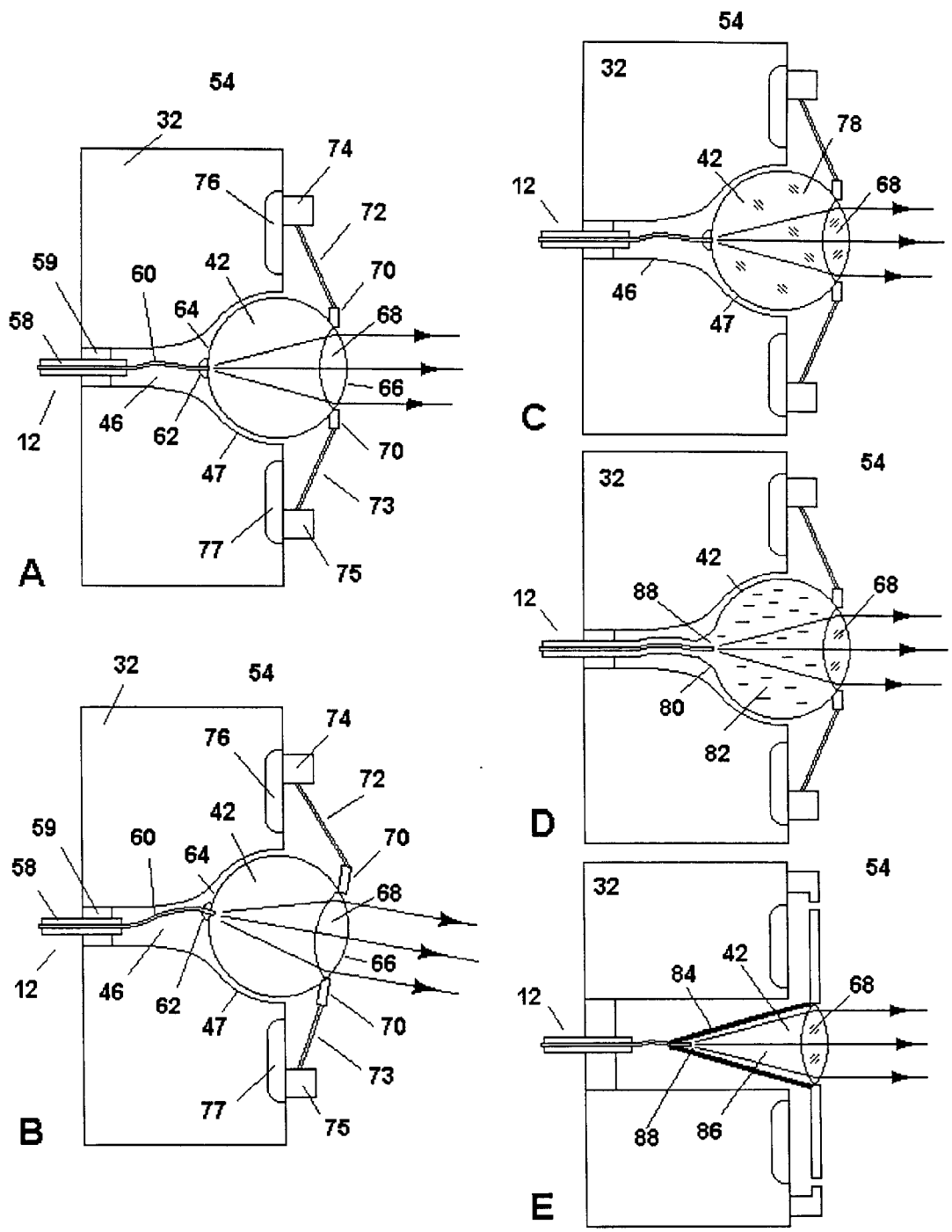
FIGS. 6(a) and (b) are schematic diagrams illustrating embodiments of transmitting directing devices of the present invention.
FIGS. 6(c)–(e) are schematic diagrams illustrating different kinds of optical bodies useful with the present invention.

Transmitting directing device 54 is shown in more detail in FIGS. 6(*a*) and 6(*b*). Array 32 or the body of array 32 includes cavities 46 and 47. Incoming fiber 12, with protective layer 58, is fixed in transmitting array 32 with fixture 59. Fixture can include a variety of different devices and materials, including but not limited to an adhesive material. The flexible end of fiber 60 is connected to optical body 42 with optical connector 62. Optical connector 62 can be a splice, an optically transparent adhesive and the like. Fiber 60 is connected to optical body 42 at a location 64, which is positioned in optical body 42 in front of a location 66 of lens 68. The portion of optical body 42 connected with connector 62 couples optical body 42 with suspension 72 and 73. Suspension 72 and 73 are connected to actuators 74 and 75 which are controlled by actuator drivers 76 and 77. Drivers 76 and 77 supply power to actuators 74 and 75, which in turn apply forces, for example an electrostatic force to suspension 72 and 73. Actuator 75 applies a pulling force to suspension 73, connector 62 then moves lens 68 and optical body 42, along with fiber 60. This results in a redirection of the light beam.

FIGS. 6(*c*), (*d*) and (*e*) illustrate different embodiments of optical body 42. As illustrated in FIG. 6(*c*), optical body 42 can be made from solid optically transparent material 78. In this embodiment, optical body 42 is located in cavity 46, 47. This provides movement of optical body 42 in a two-dimensional, eyeball like configuration.

FIG. 6(*d*) shows that optical body 42 can be made from plastic film 80 filled with transparent liquid 82. Alternative, as illustrated FIG. 6(*e*), optical body 42 can be made from framework 84 with an interior that includes an optically transparent air or clean gas 86. Light from the end of fiber 88 is then collected and focused by lens 68.

Figure 7:
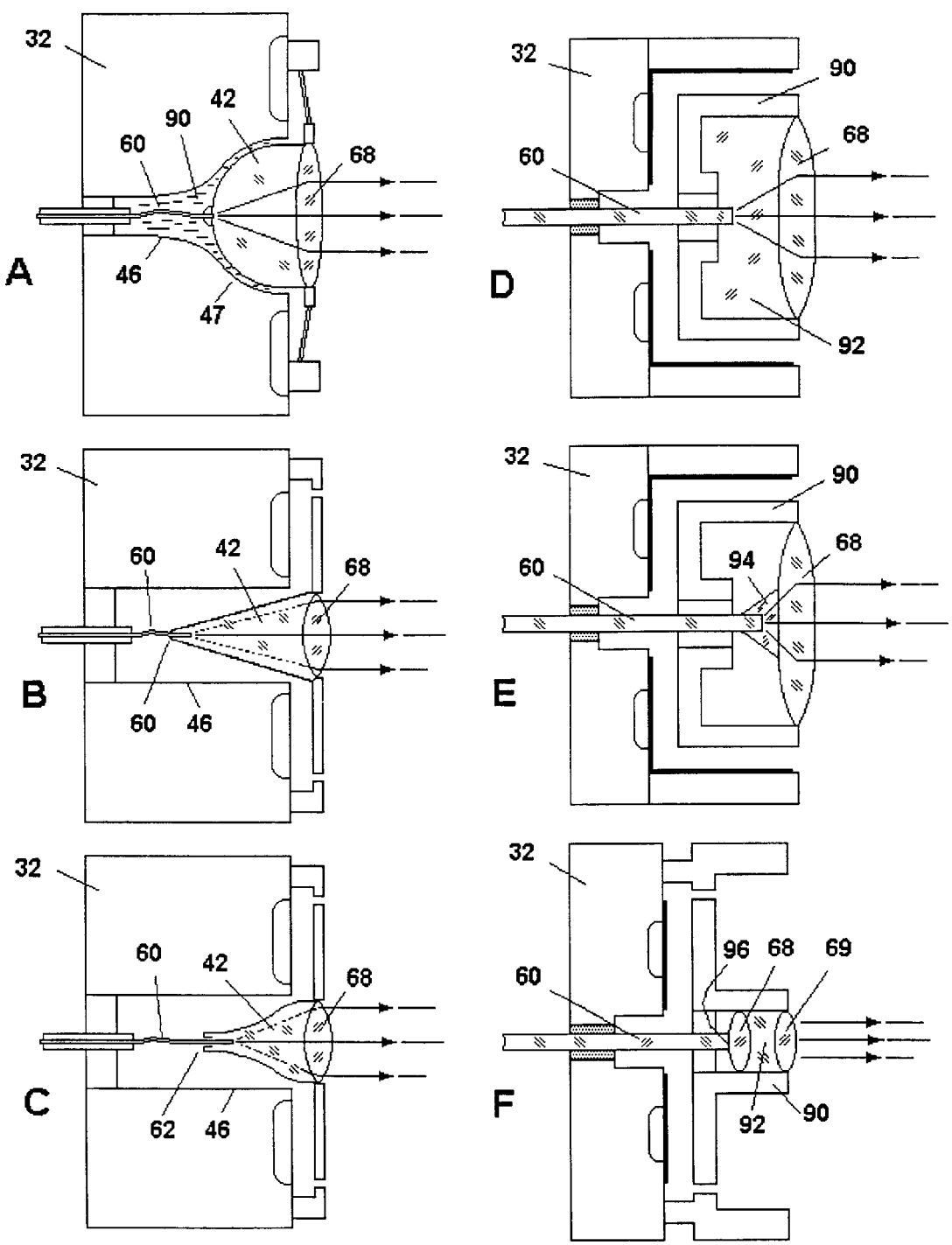
FIGS. 7(a)–(f) are schematic diagrams illustrating different geometric shapes of optical bodies useful with the present invention.

FIGS. 7(*a*)–(*f*) also illustrates different shapes and types of optical bodies 42. In FIG. 7(*a*), a portion of optical body 42 has a spherical shape. Optical body 42 can have a funnel type of geometric configuration where fiber 60 and optical body 42 move. Cavity 46 can be filled with liquid material 90. In this embodiment, optical body 42, with its spherical shape, behaves similar to an eyeball and has an advantage of not requiring spring suspension. Spring suspension usually serves two functions, mechanical shock protection and providing angular tilt of optical body 42. In the FIG. 7(*a*) embodiment, the tilt of optical body 42 does not require large displacement or shock protection. Liquid material 90 in cavity 46 provides lubrication between optical body 42 and cavity 46 in the process of rotating optical body 42 for redirecting the light beam.

FIG. 7(*b*) illustrates and embodiment where optical body 42 has a conical geometric configuration. If the shape of the cone corresponds to the shape of the diverged light beam exiting from the end of fiber 60 to lens 68, then the mass of optical body 42 can be minimized for a selected optical body 42 material. In this embodiment, cavities 46 in transmitting array 32 have cylindrical geometric configurations. If optical body 42 is suspended by springs there is no need for a funnel like optical cavity 46, where the spherical body seats, and optical cavity 46 can be cylindrical. In FIG. 7(*c*) optical body 42 is illustrated as having funnel geometry, which can be easier to fabricate in a batch process.

As illustrated in FIG. 7(*d*), optical body 90 is cylindrical where it is coupled at the bottom with fiber 60. Lens 68 is positioned at the opposing side of the body. The space between fiber 60 and lens 68 can be filled with an optically transparent material 92 which can decrease the height and mass of optical body 90.

The embodiment of FIG. 7(*e*) is similar to that of FIG. 7(*d*) except that the inside of the cylinder is not completely filled with optically transparent material. In this embodiment, optically transparent material 94 is used as a mechanical and optical connector 94 between fiber 60 and lens 68, and decreases the mass of the cylindrical body.

In the FIG. 7(*f*) embodiment, optical body 90 includes a system of lens 68 and 69. Fiber 60 can be connected with lens 68 with a very thin layer of optically transparent material 96. The space between lenses 68 and 69 can also be filled with optically transparent material 92. The use of lenses 68 and 69 and the additional optical transparent material 96 decreases the size and the mass of the movable parts of optical switch 30.

Figure 8:
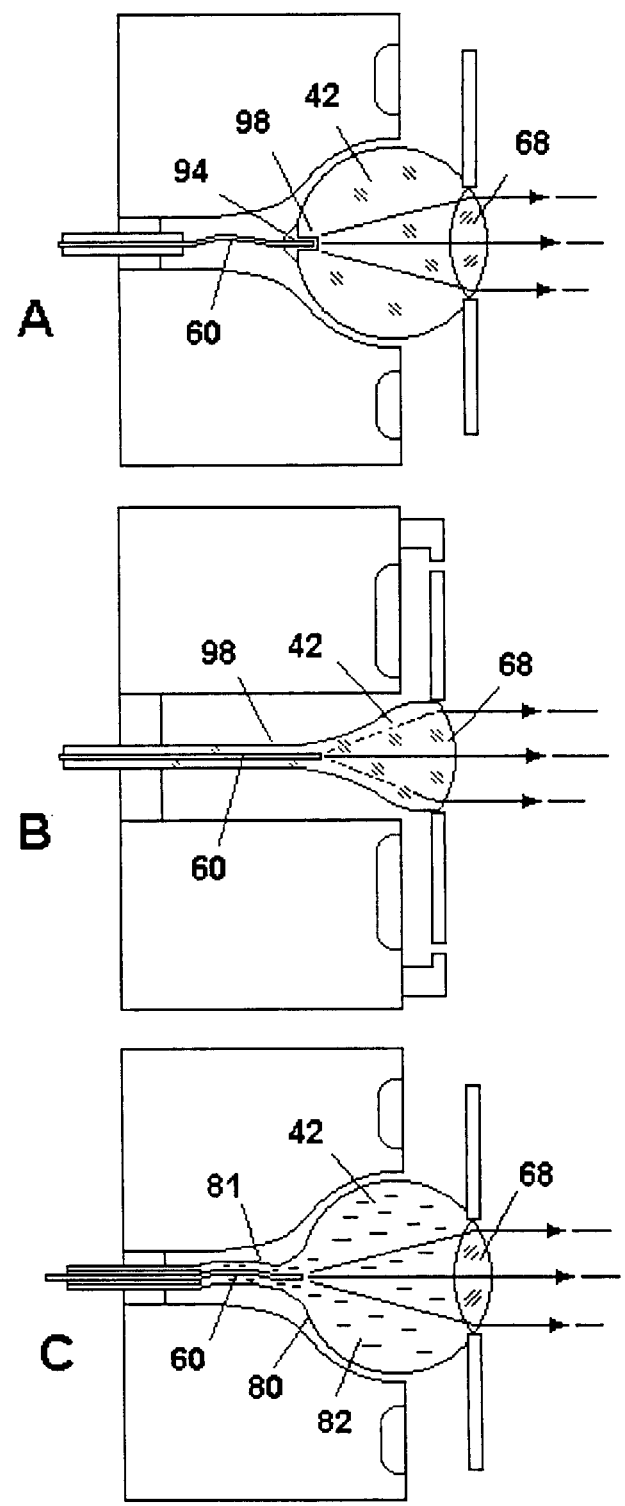
FIGS. 8(a)–(c) are schematic diagrams illustrating an embodiment of fiber connectors of the present invention.

The embodiments of FIGS. 8(*a*)–8(*c*) illustrate the relationship of connector 62, fiber 60 and optical body 42.

In FIG. 8(*a*) fiber 60 extends into and is connected in cavity 98 with optically transparent and mechanically strong adhesive 94. Connector between optical body 42 and fiber 60, can be made as a solid single body, as illustrated in FIG. 8(*b*). In this case, lens 68 and fiber 98 are made as a single optical body 42. Fiber 98 is connected to fiber 60.

In FIG. 8(*c*), optical body 42 can be made from plastic film 80 and filled with liquid 82. In this embodiment, connector of body and fiber can be made as a continuation of optical body 42 as a hose 81. Fiber 60 is inserted in hose 81 making an optical and mechanical connection with body 42.

The light beam coming from the transmitting fiber should be collimated or focused for being redirected through the open space between transmitting and receiving arrays 32 and 36. A variety of different lenses can be used for this purpose including but not limited to, GRIN lenses, regular micro-lenses, diffraction grated lenses, micro-Fresnel lenses and the like. Disadvantage of GRIN and micro-lenses is that they have larger masses. Fresnel and grating micro-lenses are preferable because they are lighter.

The size and the material of the lens is determined by a variety of factors including but not limited to, the required diameter of the beam size, mass of the focusing system, required optical properties and the like. In one embodiment, the size of the lenses used with optical switch 30 is in the millimeter and sub-millimeter range. Different materials can be used for the lenses depending on, the required wavelength, refractive index and technological processes. Suitable materials include but are not limited to different kinds of glass, semiconductor materials, different polymers and the like.

Figure 9:
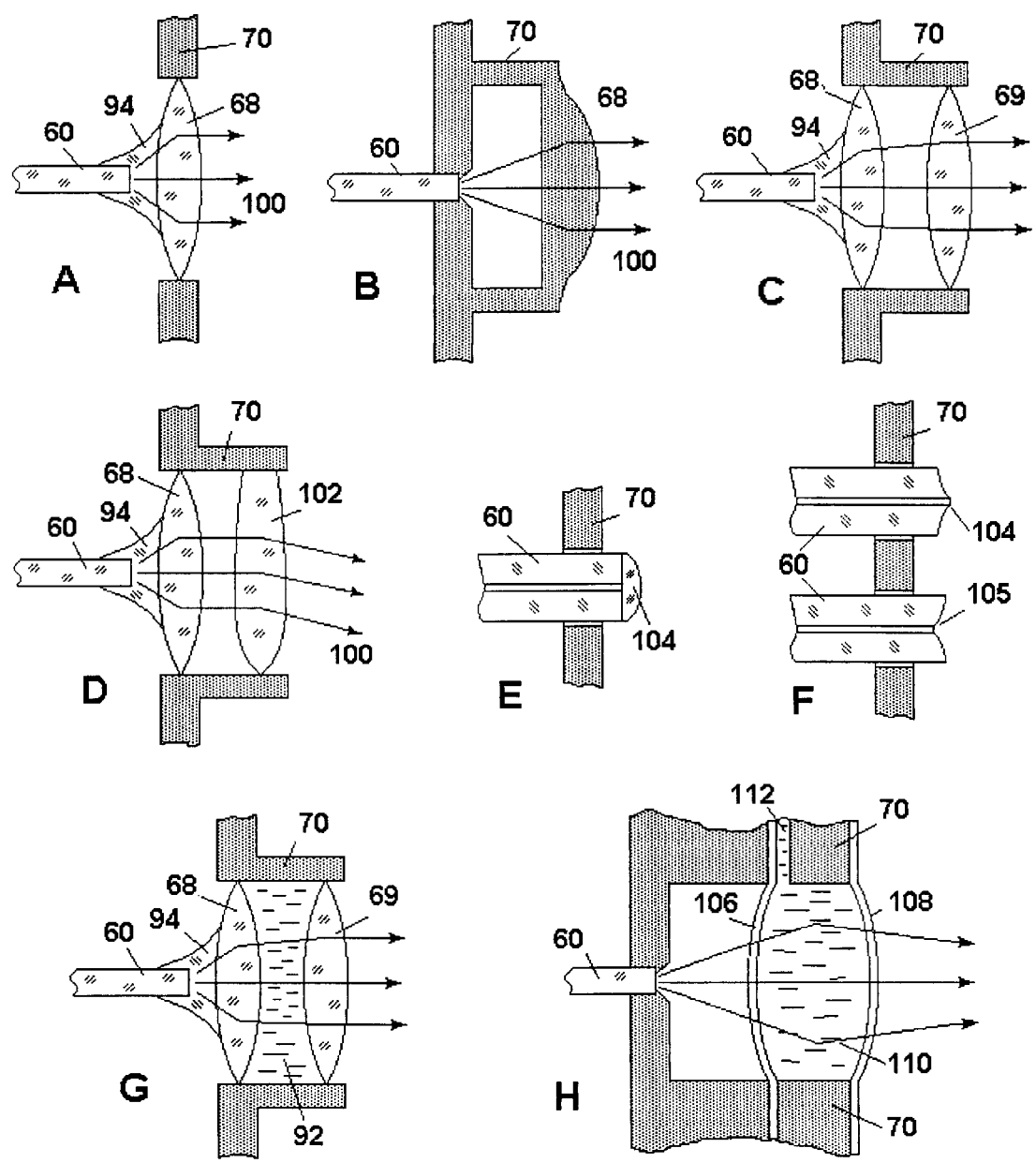
FIGS. 9(a)–(h) are schematic diagrams illustrating various lens system embodiments of the present invention.

FIGS. 9(*a*)–9(*h*) illustrate different embodiment of lenses that are employed at the output end of optical body 42 of transmitting array 32, and at the input end of optical body 42 of receiving array 36.

In FIG. 9(*a*), a simple one lens 68 is coupled to connector 94 and moveable part 70, and is optically and mechanically connected at the end of fiber 60 with optically transparent material 94. A change in the angular position of movable part 70 moves lens 68 and the distal end of fiber 60, resulting in a redirection of light beam 100. Lens 68 can be made from different materials including but not limited to, glass, polymers, silicon and the like. Making lens 68 from the same structural material as the other components, for example silicon, has an advantage of direct integration of lens 68, or system of lenses, with other MEMS components, as illustrated in FIG. 9(*b*).

Referring now to FIG. 9(*c*), a system of lenses 68 and 69 are positioned in moveable part 70 at a selected distance in order to improve the collimating or focusing of the light beam. Lens 68 can be coupled to the distal end of fiber 60 with an optically transparent adhesive 94. In FIG. 9(d), lens 102 is asymmetric and deflects the light beam to a certain angle in a neutral position of movable part 70. In this embodiment, lens 68, which serves as a focusing lens, can be coupled to the distal end of fiber 60 with an optically transparent adhesive 94.

As illustrated in FIG. 9(e) when the size of lens 104 is comparable with the diameter of fiber 60, lens 104 can be positioned at the distal end of fiber 60 and directly connected to moveable part 70. In other embodiments, shown in FIG. 9(f), lenses 104 or 105 can be made from fiber 60 itself.

The system of lens illustrated in FIG. 9(g) is similar to 9(c), and the space between lenses 68 and 69 can be filled in with an optically transparent material 92 that has required optical properties in order to optimize the focusing or collimating of the total light beam. For example, optically transparent material 92 can change the diameter and the length of the focuser. This affects the performance characteristics of the lens system. FIG. 9(h) illustrates a lens 68 made from elastic optically transparent polymer films 106 and 108. The inside volume of lens 68, in this embodiment, is filled with a transparent liquid 110 which can be delivered to the inside of lens 68 through a capillary channel 112. Lens 68 is mounted on moveable part 70 where the end of fiber 60 is also mounted and at a certain distance from lens 68. The space between the distal end of fiber 60 and lens 68 can also be filled with an optically transparent liquid in order to optimize the mechanical and optical properties of the lens system.

FIGS. 10(a)–10(f) illustrate different embodiments of micro-collimators or micro-focusers that are based on either micro-Fresnel lenses or grating micro-lenses.

Figure 10:
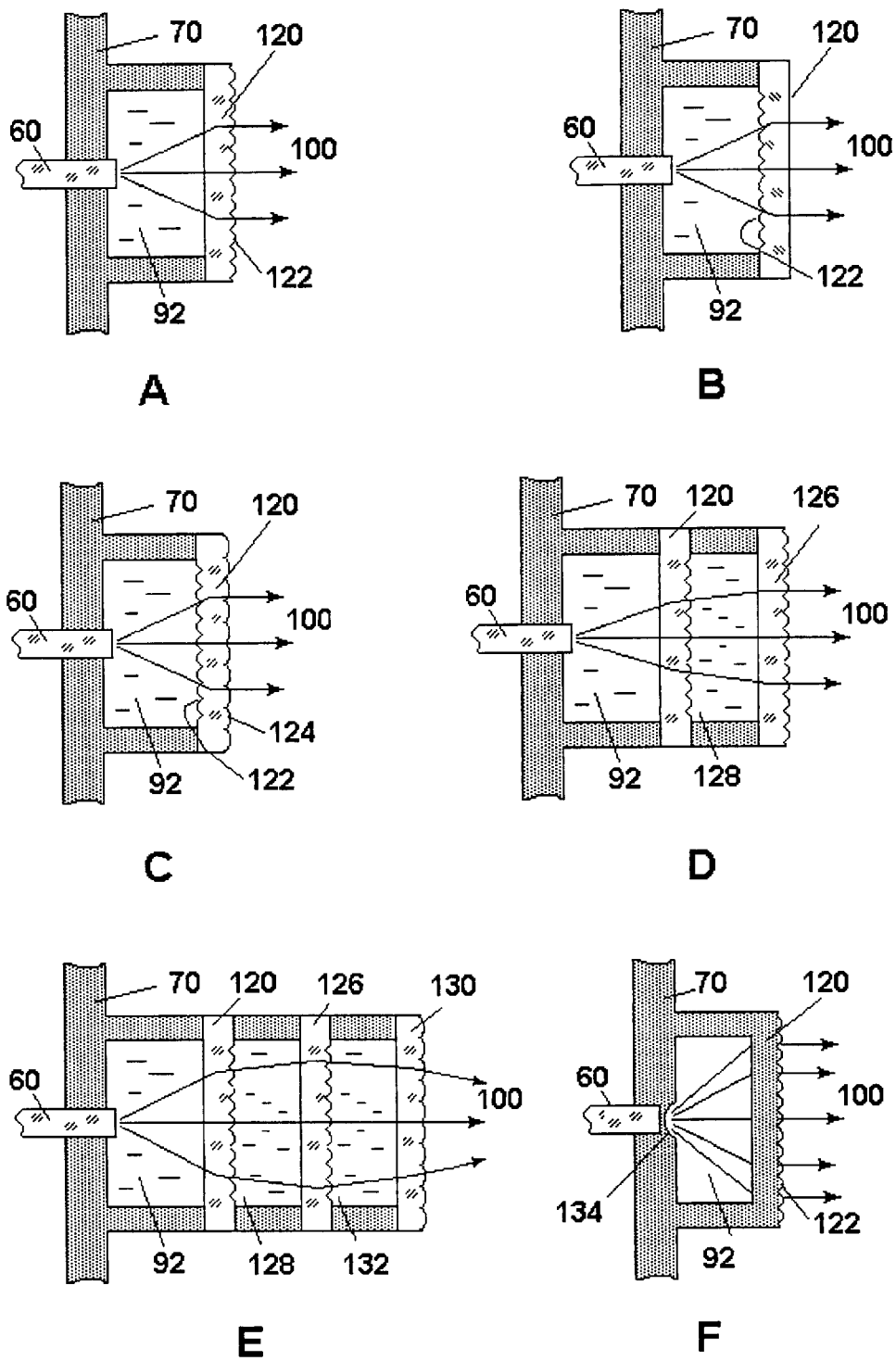
FIGS. 10(a)–(f) are schematic diagrams illustrating additional lens system embodiments of the present invention.

In the FIG. 10(a) embodiment, a simple collimator/focuser is based on one lens 120 that is in a fixed relationship to moveable part 70. The distal end of fiber 60 is also fixed to movable part 70. Lens 120 can have a grating surface 122 that is formed on the outside of the collimator/focuser. The space between the distal end of fiber 60 and lens 120 can be filled with an optically transparent material 92 that has optical properties for optimizing the collimator geometry. In some instances, for example when the grating lens is fabricated on one wafer that is bonded to another wafer with other MEMS components, it is preferable to position gratings 122 on the inside surface of lens 120, as shown in FIG. 10(b).

Both surfaces 122 and 124, of lens 120 can be grating surfaces in order to provide an improvement in the optical properties of the focuser/collimator. This is illustrated in FIG. 10(c).

With the embodiment of FIG. 10(d), two grating lenses 120 and 126 are fixed in moveable part 70. Fiber 60 is also optically and mechanically connected with movable part 70. The space between lenses 120 and 126 can be filled with an optically transparent material 128. The use of a two-lens system provides greater flexibility in designing required optical properties of the focuser/collimator.

Referring now to FIG. 10(e), a system of three lenses, 120, 126 and 130, are used for greater focusing and collimating ability. It will be appreciated that the grating properties of lenses 120, 126 and 130 can be different as well as the distance between the lenses. The FIG. 10(e) embodiment provides greater flexibility in achieving the required optical properties of the focuser/collimator. An additional telescopic lens 134 can be used for decreasing the length and the mass of the focuser/collimator. When the same structural material is used for lens 120 and the other components, then the structure of the integrated micro-collimator can look like that illustrated in FIG. 10(f).

When the size of transmitting and receiving arrays 32 and 36 is large (see FIG. 4) or comparable to the distance between transmitting and receiving arrays 32 and 36, then the deflection angle or tilt of transmitting and receiving arrays 32 and 36 should be large. In this case if the light beam is focused not optimally, then the size of the spot of the beam on receiving array 36 can change significantly between the center of receiving array 36 and its periphery. In this case it can be desirable to provide an adjustable focusing of the lenses so that the diameter of the light spot on receiving elements of array 36 would have the same size. This also requires refocusing of the light beam and can be achieved with adjustable focus lenses, as illustrated in FIGS. 11(a)–11(c).

Figure 11:
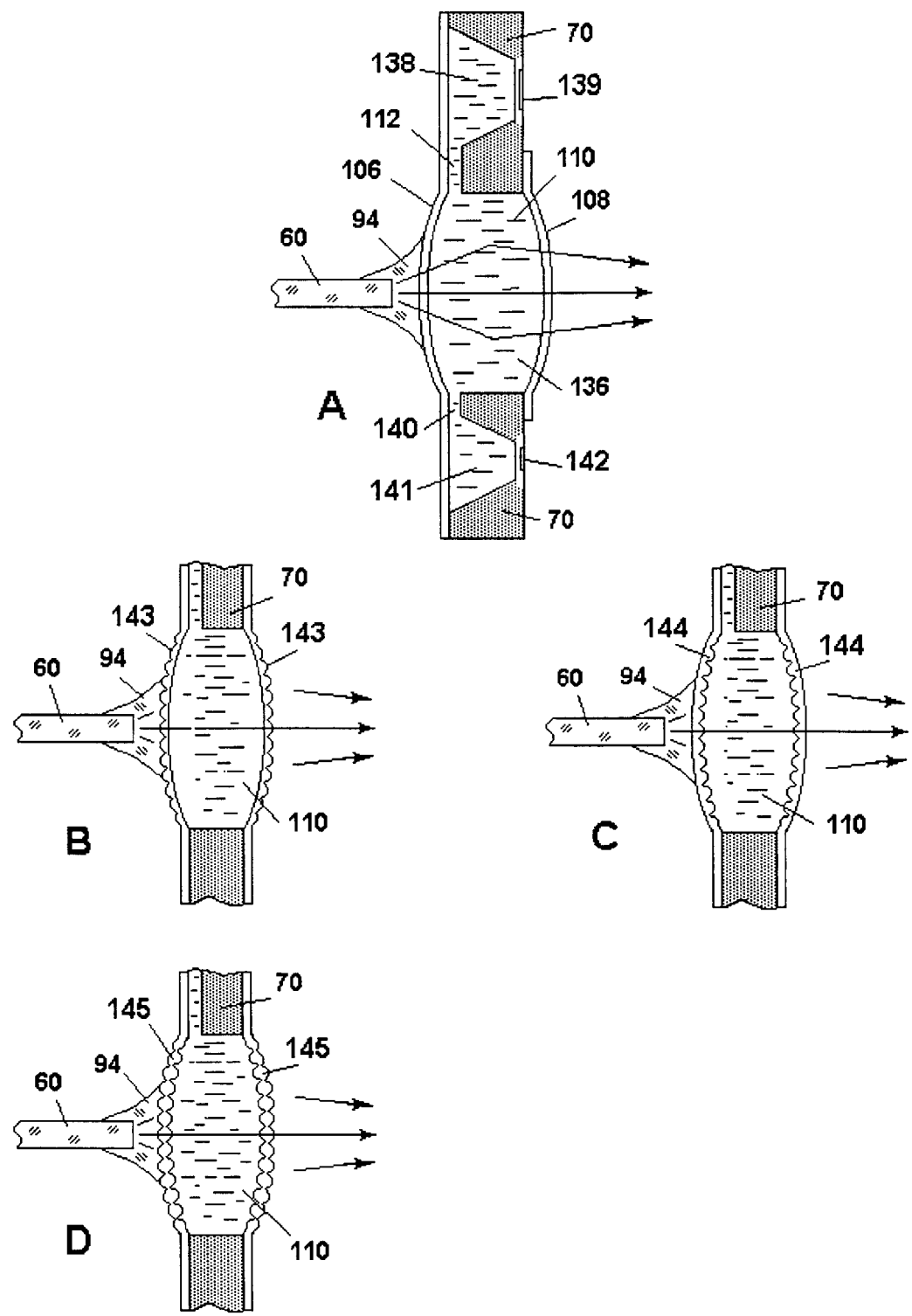
FIGS. 11(a)–(d) are schematic diagrams illustrating various embodiments of focusing devices of the present invention.

FIG. 11(a) illustrates the principle of a lens with an adjustable focus. This lens consists of two optically transparent polymer films 106 and 108 that are fixed on moveable part 70. An interior volume between polymer films 106 and 108 can be filled with an optically transparent liquid 110. The same optically transparent liquid 110 is in a capillary channel 112 that is coupled to chamber 138 where actuator 139 is positioned. Chamber 136 is filled with optically transparent liquid 110 and coupled, through channel 140, to another chamber 141. Chamber 141 includes a pressure sensor 142. One of the polymer films 106 and 108 is mechanically and optically connected to the end of fiber 60 with optically transparent material 94. Actuator 139, which can be a thermal actuator, changes the pressure of the optically transparent liquid 110 in chamber 138. This pressure is equalized and changes the pressure in chamber 136. Due to the changing of pressure films 106 and 108 change their shape resulting in a change in the radius and focus of the lens defined by films 106 and 108. The value of the pressure inside the lens can be sensed by a pressure sensor 142. The pressure is proportional to the curvature and focal distance of the lens.

FIG. 11(b) illustrates a combination of the FIG. 11(a) focusing lens with the grating lenses with grating films 143 are positioned on the outside of the lens and the inside of optical body 94. When pressure inside the lens changes, and the curvature of the polymer grating lens changes, then a change of the focal distance of the lens can occur due to two factors, change of the curvature of the regular lens and change of the grating geometry in the grating lens. The combined effect of focal distance variation can be larger.

Figure 1:
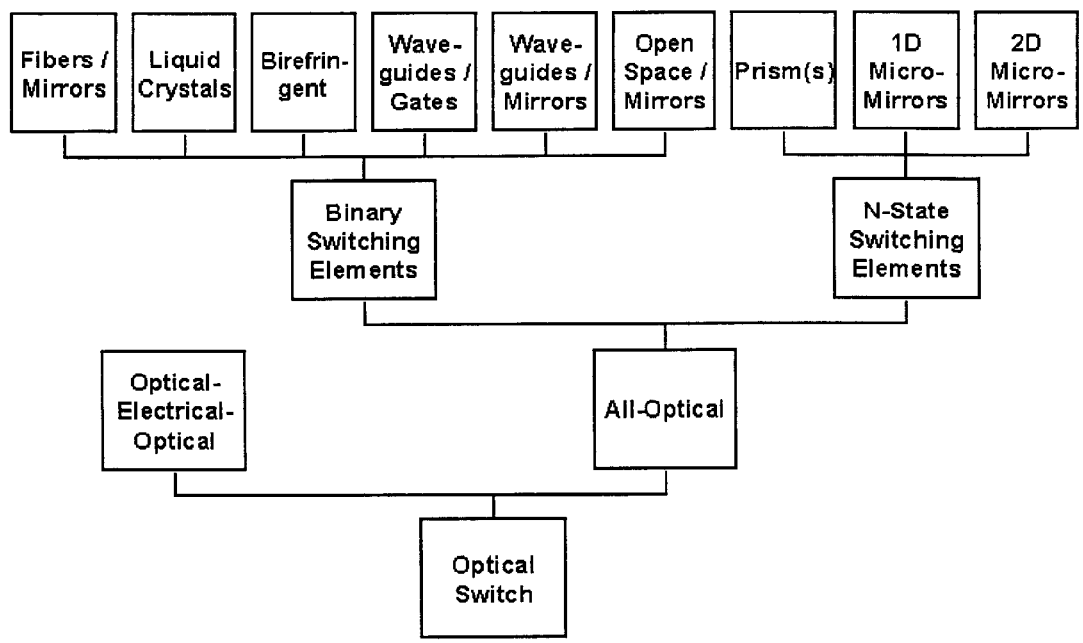
FIG. 1 is a schematic diagram of prior art optical switches.
Figure 2:
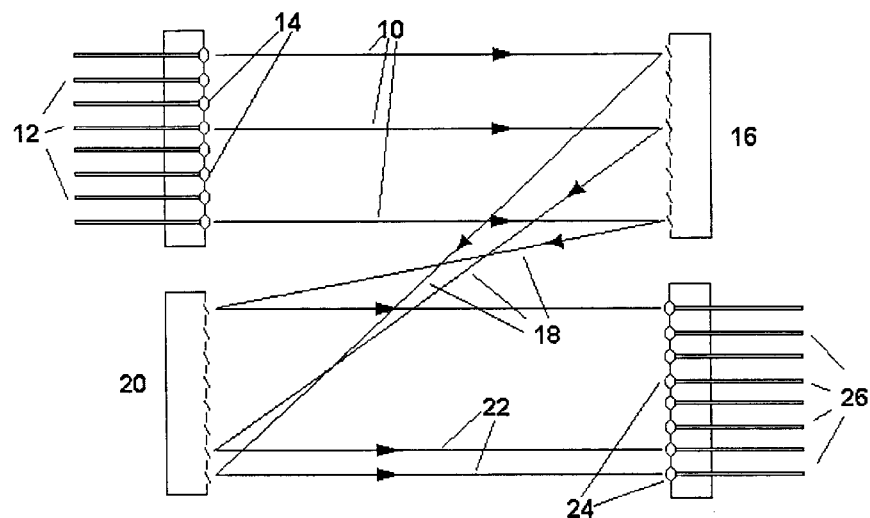
FIG. 2 is a prior art schematic diagram that illustrates open space optical switching technologies based on MEMS micro-mirrors.

Variations in pressure applied to grating films 143 can be used for correction of the light beam characteristics. A grating 144 can be located on the interior surface of a film 145 that is inside the lens, as shown in FIG. 1l(c), or from both sides of film 145, illustrated in FIG. 11(d).

Figure 12:
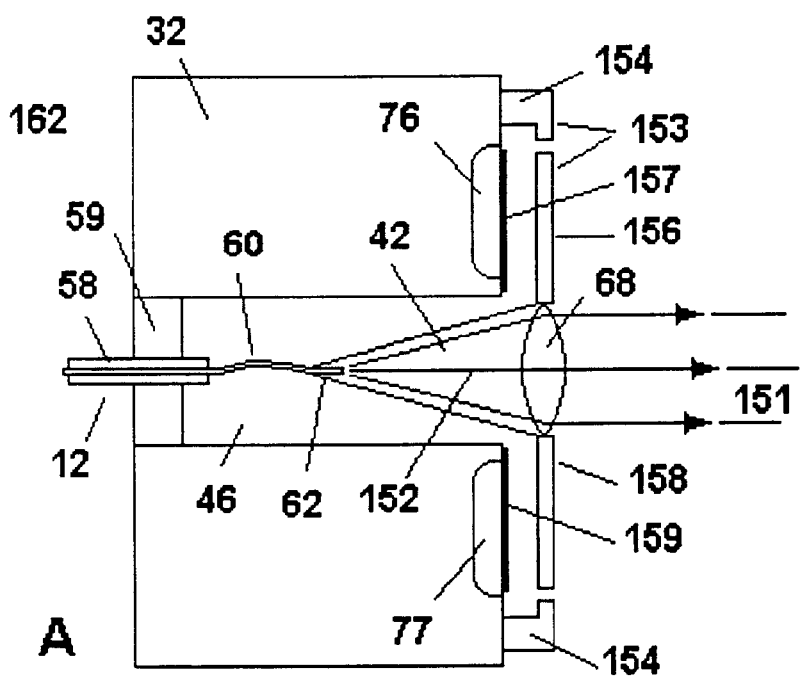
FIG. 12 is a schematic diagram illustrating one embodiment of a transmitting directing device of the present invention.
Figure 12:
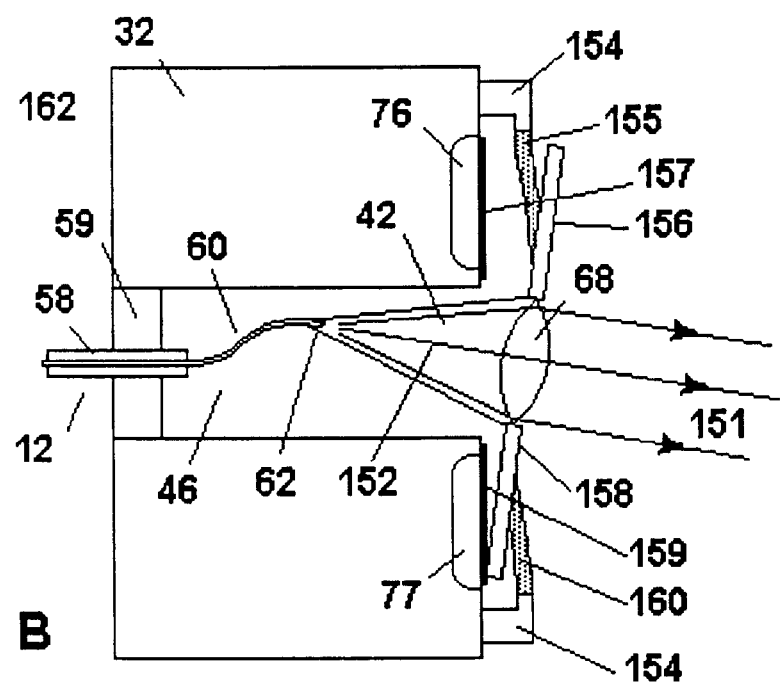

Referring now to FIG. 12(a), one embodiment of the cross-section of an one-fiber cell 162 of transmitting directing device 54 is illustrated. One-fiber cell 162 contains base member 32 coupled to a micro-machined die 153. Micro-machined die 153 includes a frame 154 and movable parts 156 and 158. Micro-machined die 153 can be made from silicon using some known MEMS micromachining processes. Lens 68 is connected with movable parts 156 and 158. Lens 68 is preferably a micro-lens located in the central area of movable parts 156 and 158. Fiber 12 is connected with base member 32 and movable parts 156 and 158. Fiber 60 is preferably coupled to movable part 156 with optical body 42. Optical body 42 limits the divergence of the light beam 152 exiting from the edge of fiber 60 and guides light beam 152 to lens 68. An end point of fiber 60 is positioned close to the focal plane of lens 68. Lens 68 transforms light beam 152 into collimated beam 151.

Actuators 76, 77, and electrodes 157 and 159 are formed in base member 32. This actuator design allows changing angular position of movable part 156 and 158. Actuators 76, 77, and electrodes 157 and 159 allow the application of force to movable parts 156 and 158 and resulting in a change in their position. Actuators 76 and 77 can be electrostatic, electromagnetic, thermo-mechanical, piezoelectric, electro-active polymers and the like. Lens 68 moves together with movable part 156 and 158. FIG. 12(a) shows movable parts 156, 158 and lens 68 in an equilibrium position when no force is applied to movable part 156 from actuators 76 and 77. FIG. 12(b) illustrates the position of movable parts 156, 158 and lens 68 after actuator 77 has applied some force to movable part 158. As can be seen from FIG. 12(a) and FIG. 12(b), changing angular position of movable part 156 allows changes the angular position of lens 68 and the direction of light beam 151. Therefore, light beam 151 can be spatially redirected by the interaction of actuator 76 and 77 with movable parts 156 158.

Frame 154 is coupled with movable parts 156 and 158 by suspensions 155 and 160, as illustrated in FIG. 12(b). Suspensions 155 and 160 are strong enough to withstand mechanical forces applied to movable parts 156 and 158 during wafer processing, including wafer separation, die handling and transmitting directing device 54 assembly. Suspensions 155 and 160 can be flexible enough to provide angular deflection of movable parts 156 and 158 by the force applied by actuators 76 and 77. Suspensions 155 and 160 also provide electrical and/or magnetic and/or thermal connection of movable parts 156 and 158 with frame 154. For example, if actuators 76 and 77 employ electromagnetic actuation, and permanent magnets are located on or in base member 32, then suspensions 155 and 160 transferring electrical current to movable parts 156 and 158. Interaction of this electrical current with the magnetic field of the permanent magnets creates a force, resulting in the angular displacement of movable parts 156 and 158 with lens 68.

Actuators 76 and 77 can also be thermo-mechanical or bimetallic. Thermo-mechanical actuators 76 and 77 can achieve larger forces and deflections compared to electrostatic and electromagnetic actuators. Thermo-mechanical actuators 76 and 77 contain heater, not shown, which heat at least a portion of suspensions 155 and 160. Thermo-mechanical stresses created in suspensions 155 and 160, as a result of heating, creates angular displacement of movable parts 156 and 158 together with lens 68. Thermo-mechanical actuators 76 and 77 can be multi-layer structures, including but not limited to metal—insulator—silicon, with a thin layer of silicon dioxide, silicon nitride, silicon carbide, and the like, used as an insulator. Single-layer thermo-mechanical actuators 76 and 77 can also be used.

There are several options for the heater structure. With a multi-layer structure, the heater can be made on the metal layer, silicon layer, or on both in the electrical circuit. The heater is electrically and thermally coupled with base 32. If thermo-mechanical, bimetallic, actuators 76 and 77 are used, then the electrical connection of micro-machined die 153 with base member 32 can provide the necessary current to the heater. The thermal connection between micro-machined die 153 and base member 32 can provide sufficient thermal resistance to, create the necessary temperature gradient across suspensions 155 and 160, and which is small enough to prevent overheating of movable structures 156, 158 and lens 68.

With piezoelectric actuators 76 and 77, a piezoelectric material, not shown, can be applied to the top of micro-machined die 153 in suspensions 155 and 160. An applied voltage to the piezoelectric material changes its linear dimensions. As a result, suspensions 155 and 160 can be bent, and movable structures 156 and 158 are deflected. This changes the angular position of lens 68. In this embodiment, piezoelectric actuators 76 and 77 are preferably electrically coupled with base 32. This coupling provides for the application of the necessary voltage to the piezoelectric material.

Figure 13:
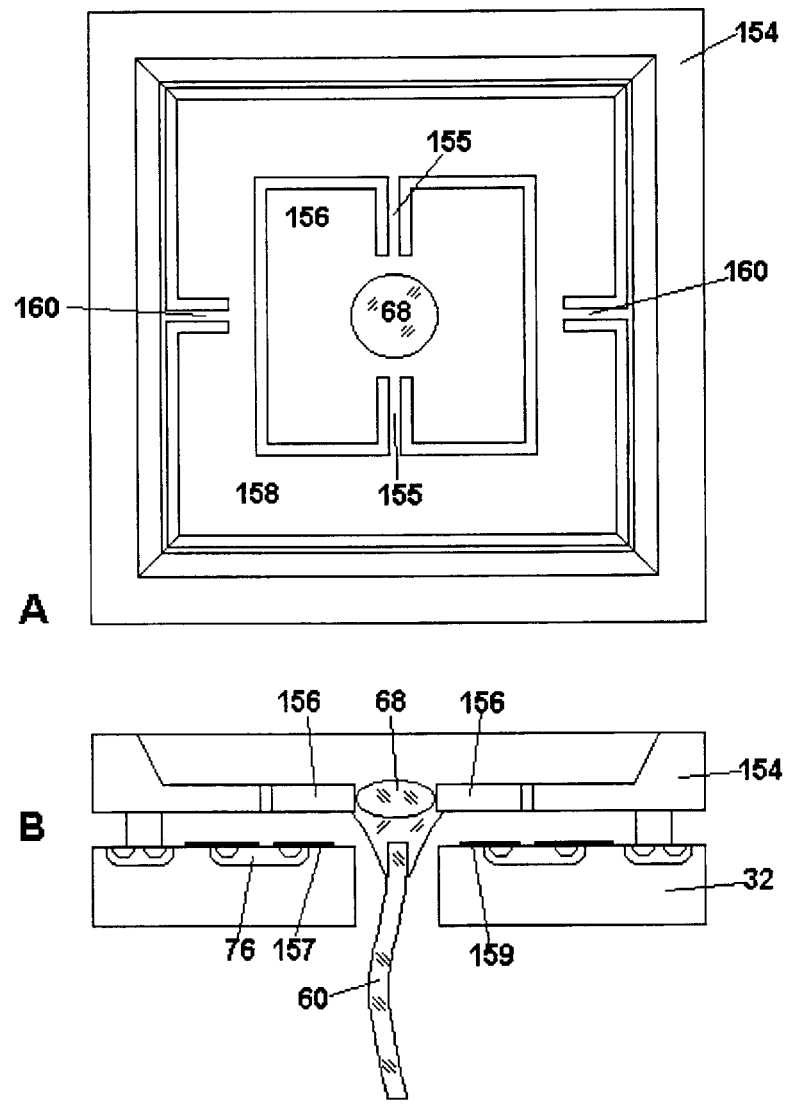
FIG. 13 is a schematic diagram of a gimbals suspension of the moveable part of a transmitting device useful in one embodiment of the present invention.

FIG. 13(a) illustrates gimbal suspension of moveable part 156. Fiber 60 is coupled to moveable part 156 which moves in one angular direction on torsion beams 155. Torsion beams 155 are coupled to outer frame or outer ring 158, which in turn, are connected by torsion beams 160 to the frame 154. This suspension provides two-dimensional angular redirecting of the light beam. This gimbals works with electrostatic actuators 76 and 77 as illustrated in FIG. 13B. When voltage is applied between moveable part 156 and one of the electrodes 157 or 159, the electrostatic force tilts moveable part 156 with lens 68 and fiber 60, resulting in a redirection of the light beam from lens 68 in one angular dimension. In the same manner, the corresponding electrodes 157 or 159 can move outer ring 158 and tilt or rotate it on torsion beams 160. Lens 68, fiber 60 and the light beam are then redirected in another angular dimension.

Figure 14:
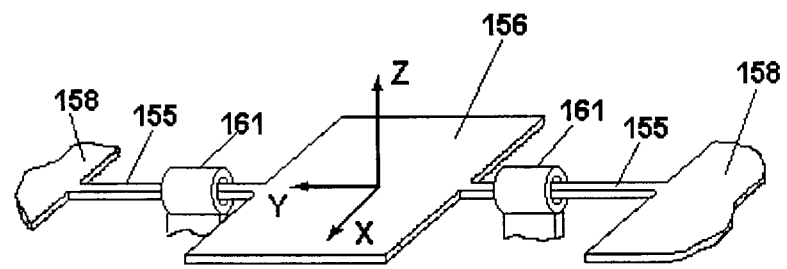
FIG. 14 illustrates the overload protection, of one embodiment of the present invention, against acceleration applied in either X or Z direction.

With any torsional suspension, including gimbal, for higher sensitivity the ratio of length to diameter of torsion suspension should be larger. However, with long suspension, mechanical shock overload protection becomes worse. With the present invention, this problem is solves, as illustrated in FIG. 14. Torsion suspension 155 goes through limiting tubes 161 that are mechanically connected to frame 158. The torsion movement of the beams and the tilt of electrodes 157 or 159 are not limited by tubes 161. However, when overload acceleration is applied in either the X or Z directions, as in FIG. 14, then tubes 161 limit the motion of suspension 155 and the mechanical shock overload protection of moveable part 156.

Suspension 155 of moveable part 156 can be made as a system of springs, for example three or more. The springs can be flat, flat planar, or flat transverse. Additionally, the springs can have different geometries such as beam structures, meandering, tethers, spiral, and the like, and can be continuous, perforated flat, corrugated diaphragms, and the like.

Figure 15:
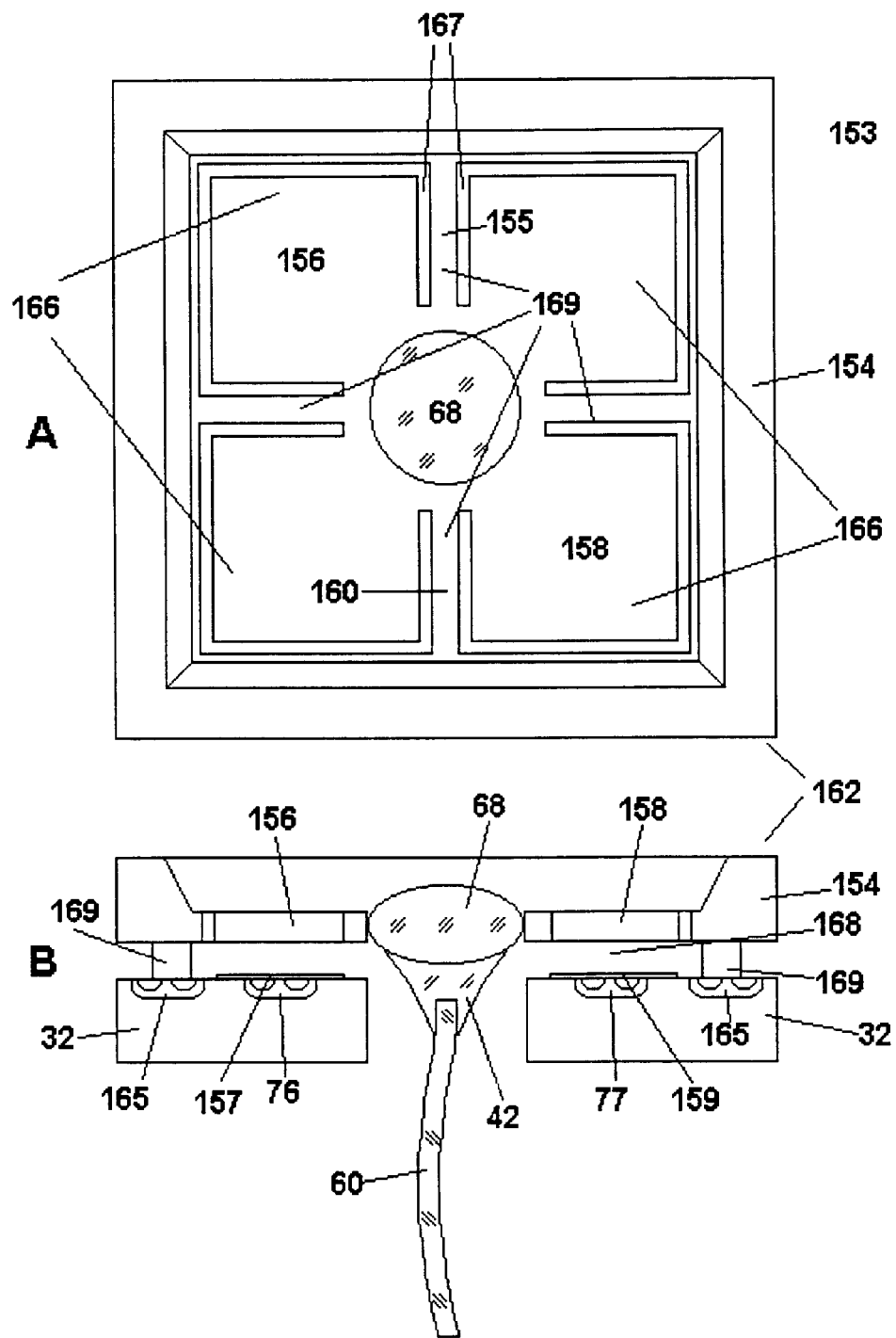
FIG. 15(a) is a top view illustrating one embodiment of a fiber cell of a transmitting directing device with an electrostatic actuator according to one embodiment of the present invention.
FIG. 15(b) is a cross-section of the FIG. 15(a) one-fiber cell.

FIG. 15(a) shows top view of a one-fiber cell 162 of transmitting directing device 54 with actuator 76 or 77 according to one embodiments of the present invention.

FIG. 15(b) illustrates a cross-section of one-fiber cell 162 of the transmitting directing device 54. One-fiber cell 162 contains base member 32 which can be made from different materials, including but not limited to ceramics, silicon and the like. Base member 32 is connected with micro-machined die 153 which includes frame 154 and movable parts 156 and 158. Micro-lens 68 is rigidly connected with the central area of movable part 156. Fiber 60 is connected with movable part 156 and micro-lens 68 with optical body 42. Movable parts 156 and 158 have smaller thickness than frame 154.

In one embodiment, moveable parts 156 and 158 includes four electrodes 166 positioned around and coupled to micro-lens 68. Electrodes 166 are isolated from frame 154 by an air-gap 167 and are suspended by four beams 164. Beams 164 also provide electrical connection of said four electrodes 166 with frame 154 with at least one conductive element formed either on the surface of the frame or in the frame such as silicon, and the like. Movable part 156 and 158 can be formed, for example, using wet chemical etching from one side of the silicon wafer followed by the reactive ion etching from the opposite side of the silicon wafer. Micromachined die 153, which is silicon in one embodiment, is mechanically and electrically connected with base member 32 via connecting members 169. At least some of the connecting members 169 can be electrically conductive. Some electrical potentials can be transferred to micromachined die 153 from electrical circuits 165 located on the surface or in the body of base member 32 using connecting members 169. For example, solder bumps can be used for the mechanical and electrical connection.

In one embodiment, electrodes 157 are located on the surface of base member 32. Different electrical potentials can be applied to movable structure 156 and to at least one of electrodes 157 and 159. The difference in electrical potentials between movable structure 156 and at least one electrode 157 causes electrostatic force attracting movable structure 156 to base member 32. When no electrostatic force is applied to movable structure 156 it maintains in an equilibrium position. The electrostatic force applied to movable structure 156 results in change to the angular position of movable structure 156. Micro-lens 68 also changes its angular orientation. This redirects the light beam, which goes through micro-lens 68.

Figure 16:
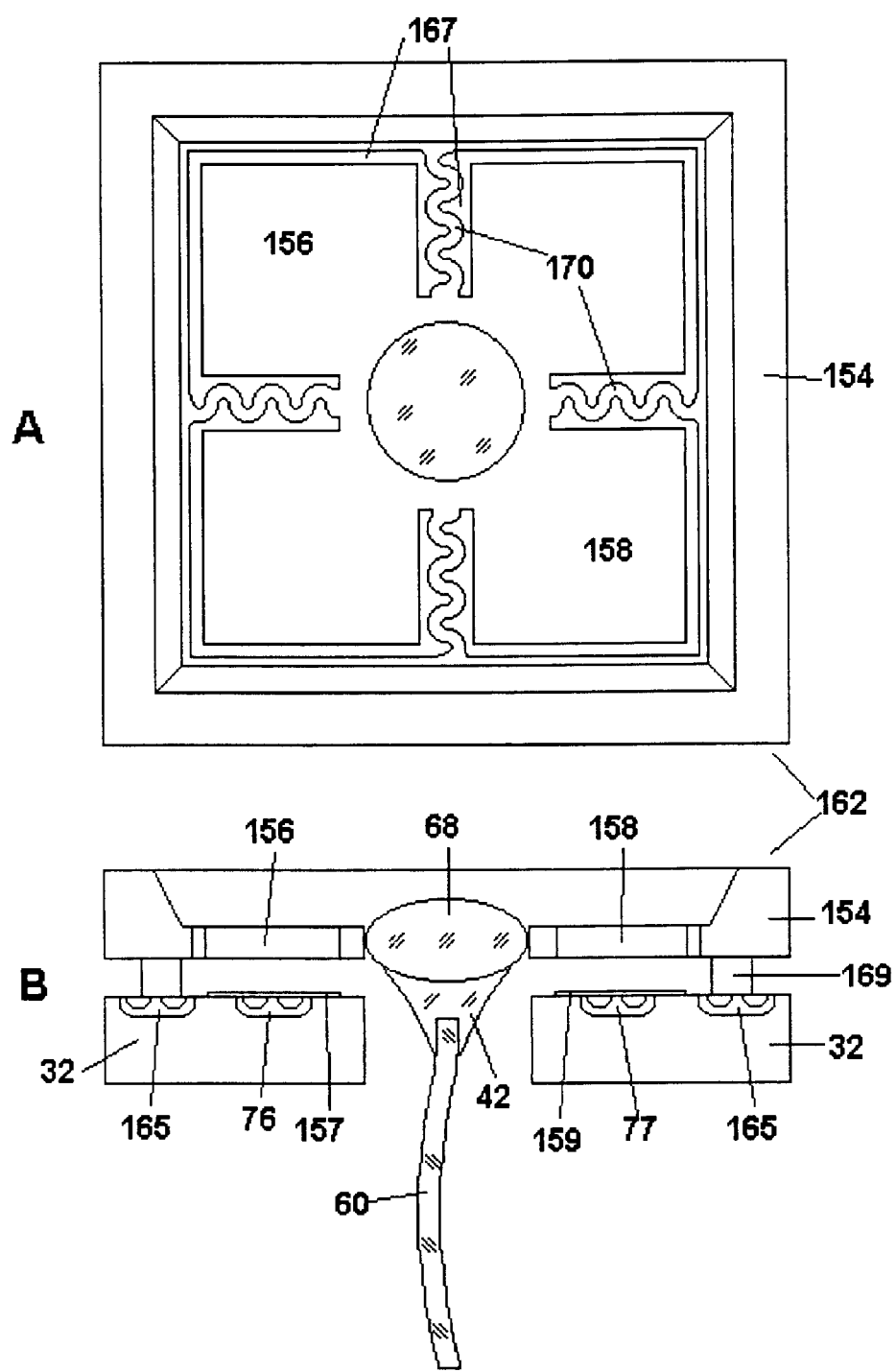
FIG. 16(a) is a top view and a cross section of the one-fiber cell of the transmitting directing device with an electrostatic actuator according to another embodiment of the present invention.
FIG. 16(b) is a cross section of the FIG. 16(a) one fiber cell.

FIG. 16(a) illustrates a top view of one-fiber cell 162 of transmitting directing device 54 with actuators 76 or 77 according to another embodiment of the present invention.

FIG. 16(b) shows a cross-section of the FIG. 16(a) one-fiber cell 162. The major difference in the one-fiber cell 162 of FIG. 16(a) in comparison with FIG. 15(a) is the different suspension 155 used for movable structure 156. The "meander" beams 170 have smaller bending stiffness compared to straight beams 155 of FIG. 15(a). This allows larger angular deflection of movable part 156 with lens 68 by applying the same voltage between electrode 157 and movable structure 156. For the same required deflection, the structure of FIG. 16(a) permits use of a smaller voltage for actuator 76.

Figure 17:
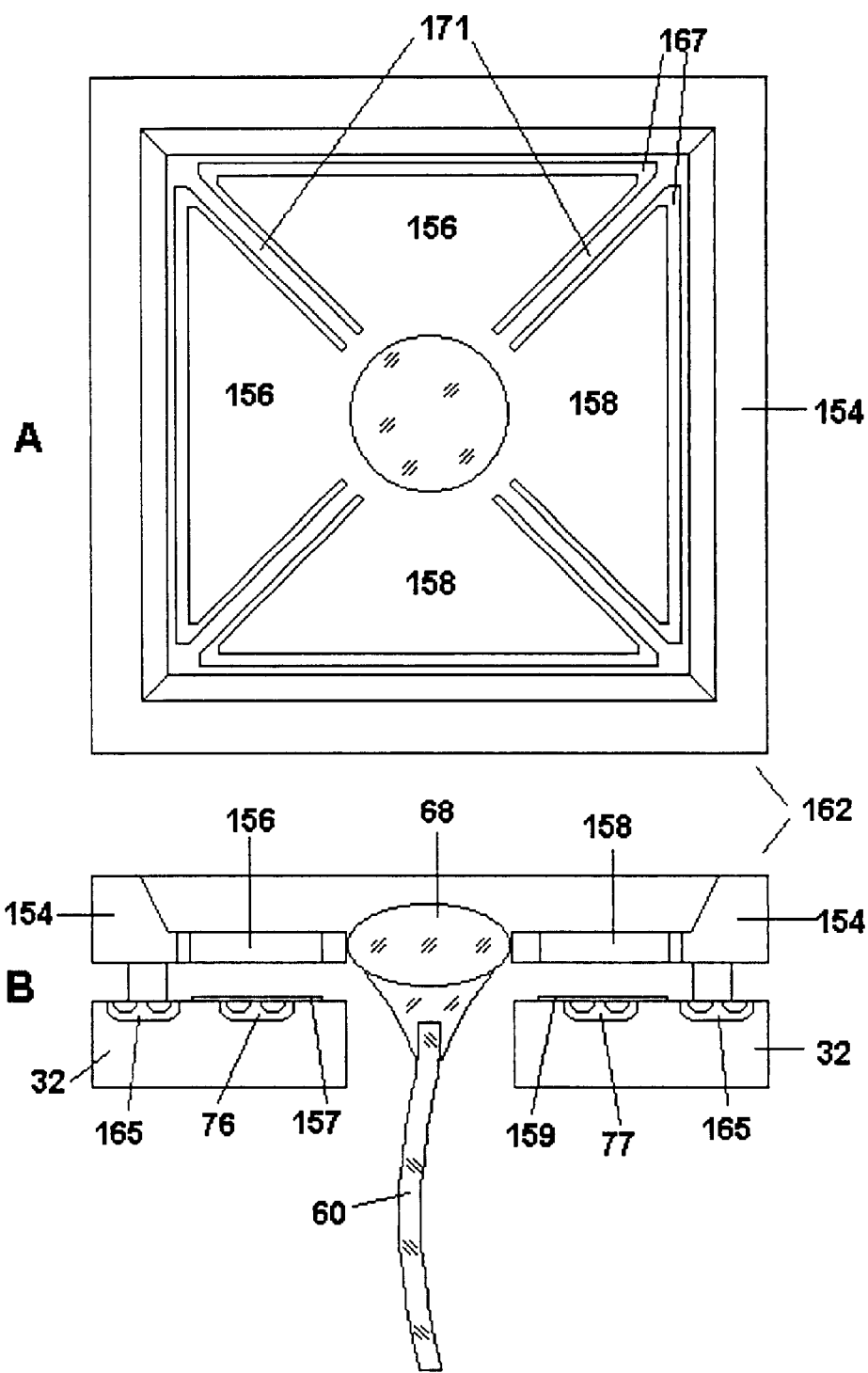
FIG. 17(a) is a top view and a cross section of the one-fiber cell of the transmitting directing device with an electrostatic actuator and a suspension using diagonal beams.
FIG. 17(b) is a cross section of the FIG. 17(a) one fiber cell.

FIGS. 17(a)–(b) illustrate different kind of suspension 155 useful with the present invention. Flat planar beams are utilized in FIGS. 17(a)–(b). Further the beams can be thin enough to be tethers that are positioned diagonally so that electrodes 157 and 159 act as plates and provide rotation or tilt of moveable part 156, lens 68 and fiber 60 in different angles. The advantage of this structure is that the diagonal suspension 155 can be longer for the same size of the rectangular die and allows a larger tilt for the same applied driving voltage.

The accuracy of the mutual angular alignment of transmitting and receiving parts affects the optical losses between the input and output channels. With the present invention, the system that controls the position of movable parts 156 and 158 should be accurate. In certain embodiments of the present invention, a closed loop, such as feedback or servo, is required to achieve this accuracy. In one embodiment of the present invention, control system 38 is closed loop and requires a feedback signal from the different beam positioning sensors. It will be appreciated that control system 38 can also be an open loop system.

Control system 38 provides the processing of the protocol data of optical switch 30, creating a system for driving actuator signals, and then distributes these signals between different actuator 76 and 77 according to the protocol. In the case of a closed loop system architecture, control system 38 also processes the signals from the sensors and adjusts the actuator control signals depending on the requirements. Control system 38 also provides feedback to actuators 76 and 77 to actively damp vibrations of the movable parts 156 and 158 caused by either sharp switching from one port to another or by mechanical shock. High accuracy and stability requirements for aiming transmitting arrays 32 into receiving arrays 36 often can not be provided by existing mechanical sensors due their low sensitivity and long term stability.

Balancing accuracy and increasing complexity can be achieved with a double closed loop control system 38. In this embodiment, control system 38 has two feedback loops. One is based on mechanical sensors built in the suspensions 155 and 160. In this embodiment, mechanical sensors provide control system 38 with the information about current position of suspensions 155 and 160 and, therefore, the orientation of the light beam. Sensors can be included with each port of transmitting and receiving arrays 32 and 36. Transmitting and receiving arrays 32 and 36 can have a limited number of sensors with fixed locations relative to the locations of the collimators. From time to time, according to the protocol, the mechanical sensors are recalibrated with the assistance of the optical sensors, and provide accurate information about the positioning of the light beam.

Micro-machined die 153 can contain one or several sensors, not shown, for the closed loop that generate electrical signals proportional to the deflection of certain elements of the suspensions 155 and 160. A set of signals from the sensors determine the position of movable structure 156 and, therefore, the spatial orientation of lens 68. The sensors can be capacative, electromagnetic, piezoelectric, piezoresistive, and piezo-junction (piezotransistor), and the like. Electrical signal from the sensors can be used for different purposes including but not limited to, (i) aiming the light beam to different receiving arrays 36, (ii) mechanical shock damping, (iii) sense vibrations after switching damping, (iv) calibration in production, (v) on-field self test, and (vi) failure detection. Capacitive sensors employ capacitance change between base member 32 and movable structure 156. The measured change of capacitance corresponds to the change of the angular position of lens 68.

Electromagnetic sensors use the effect of voltage generation in the case of a moving conductor in a magnetic field. The magnetic field can be created by one or more permanent magnets located on or in base member 32. One or more conductors can be located on suspensions 155 and 160 and/or on movable structure 156.

Piezoelectric sensors also can be used with suspensions 155 and 160. Mechanical stress in suspensions 155 and 160 due to their deflection caused by actuators 76, 77 creates electrical charge in the piezoelectric film that can be detected by control circuitry.

Piezoresistive sensors and piezo-junction sensors are based on the same physical effect, the dependence of the carriers mobility on mechanical stress in semiconductor materials. This effect causes changes of the resistance in an amount that is proportional to the stress in the piezoresistor area. It also causes changes of the p-n junction parameters under stress and this change can be effectively amplified in piezotransistor-based circuits. Both bipolar and CMOS piezotransistors can be used. Different circuits with piezoresistors and piezotransistors can be used. For example, a Wheatstone bridge or four-terminal resistor (X-ducer) can be used in a piezoresistive sensor circuit. Piezotransistors combined in different circuits can provide smaller areas on the surface of suspensions 155 and 160, orders of magnitude higher sensitivity and either analog or digital output.

FIGS. 18(a)–18(e) illustrates different examples of suspensions and electrodes for actuators 76 or 77. The number of possible embodiments of these suspensions and associated movable parts is not limited by the following examples.

Figure 18:
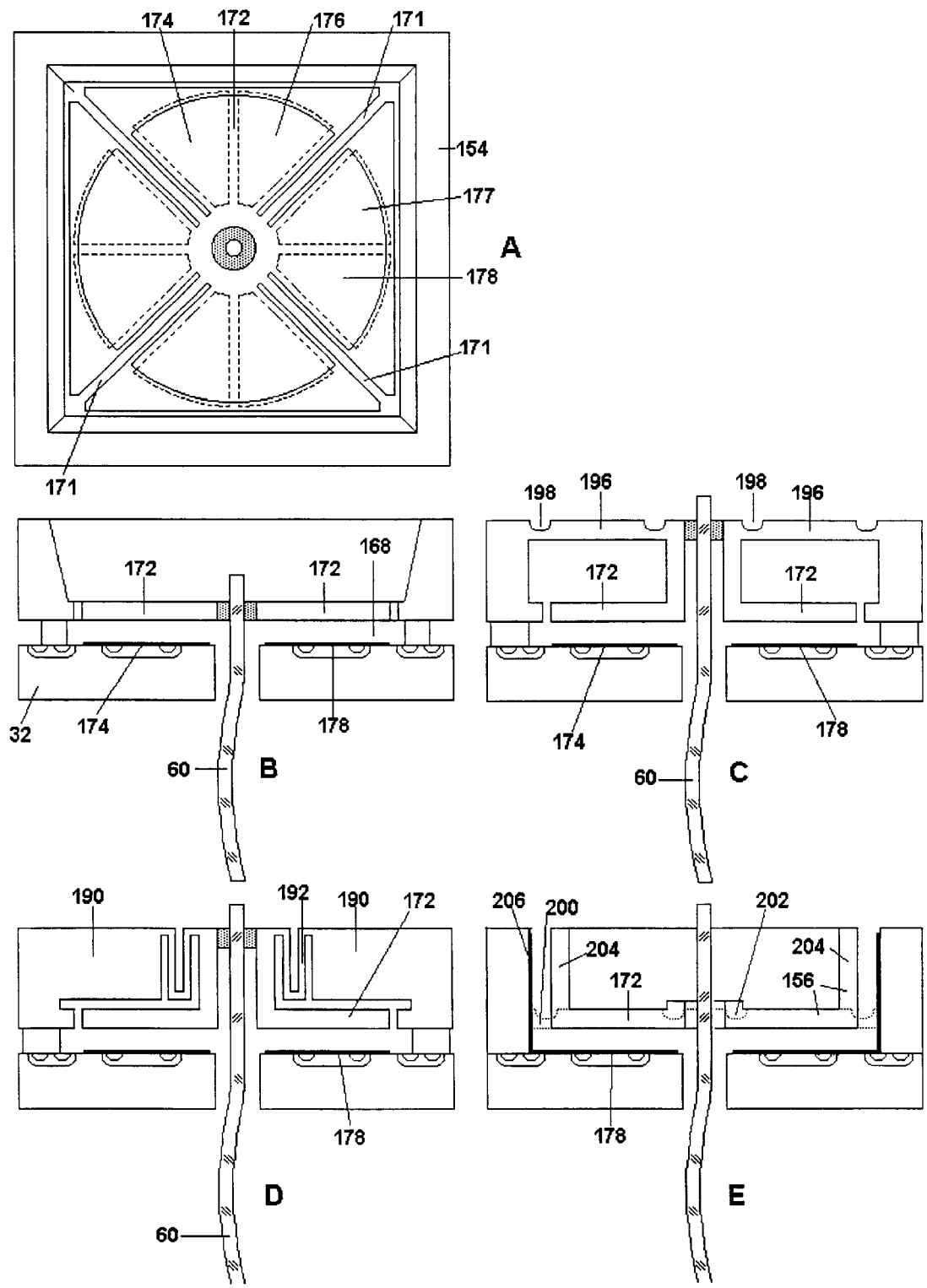
FIG. 18(a) is a top view illustrating one embodiment of an actuator used with the present invention.
FIG. 18(b) is a cross sectional view illustrating one embodiment of an actuator with a planar suspension used with present invention
FIG. 18(c) is a cross sectional view illustrating one embodiment of an actuator with non-uniform beam suspension and actuation movable plates located in different plane relative to suspension used with the present invention.
FIG. 18(d) is a cross sectional view illustrating one embodiment of an actuator with spring like suspension and actuation movable plates located in different plane relative to suspension used with the present invention.
FIG. 18(e) is a cross sectional view illustrating one embodiment of an actuator with non-uniform beam suspension and actuation movable plates having additional cylindrical surface providing increased actuation force used with the present invention.

FIG. 18(a) shows that electrodes 172 are made as circular plates so that they can provide equal maximum tilt when one of the edges of electrode 172 travels down in different angular directions. The maximum angular deflection in any direction is determined by a gap 168, illustrated in FIG. 18(b) between electrodes 172 and actuators the electrostatic plates of 174, 176, 178, and the like, of an actuator 76.

The number of electrostatic plates 174, 176, 177, 178 of an actuator 76 can vary. By way of example, without limitation, actuator 76 in FIG. 18(a) includes eight electrostatic plates, 174, 176, 177, 178 and so on. The angle of position of moveable part 156 depends on which electrostatic plates 174 and so on, receive an applied voltage. Applying the voltage to either plates 174, 176, 177, or 178, can change the two-dimensional angular position of moveable part 156.

FIG. 18(b) illustrates a simple flat structure of electrodes 157 and 159 the suspension. In this case the suspension and electrodes 157, 159 are located in the same plane.

FIG. 18(c) shows a different embodiment of suspension and electrodes 157, 159. In this embodiment, electrodes 172 can be continuously circular without slots for the suspension. Suspension is provided by beams 196, which can be non-uniform in thickness and have thinner sections 198. When a voltage is applied to plates 174 or 178 the electrostatic force attracts corresponding parts of moveable member 172. This results in a change of the angle or position of fiber 60 and beam 196 to create the required tilt or angle of the outgoing light beam.

Figure 19:
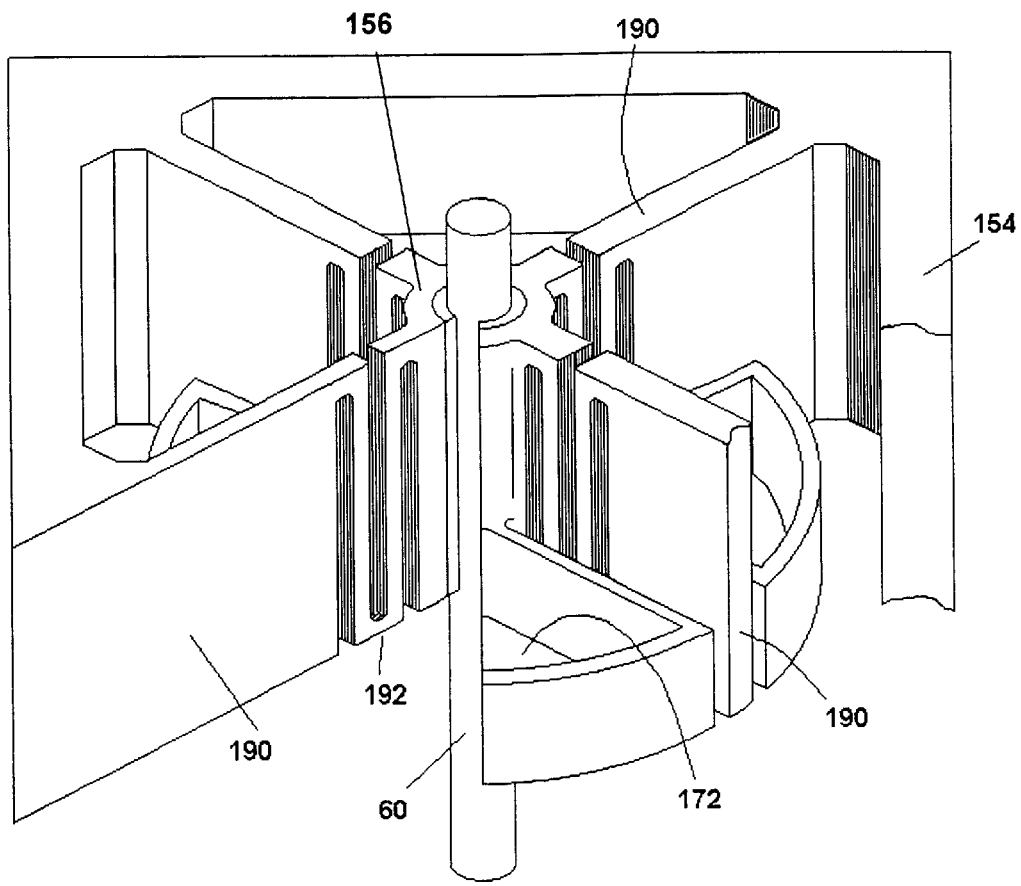
FIG. 19 is a three-dimensional view of the suspension illustrated in FIG. 18(e).

FIG. 18(d) illustrates another suspension embodiment of the suspension which has flat transverse beams 190 optionally one or more springs 192 is included as part of the suspension. This type of suspension is also illustrated three-dimensionally in FIG. 19. When voltage is applied between electrodes 178 and 172, the electrostatic force attract electrode 172 and all movable parts of the moveable member together with fiber 60 will tilt. Springs 192 make the suspension more flexible for tilt and less voltage is required for the same degree of tile.

Figure 20:
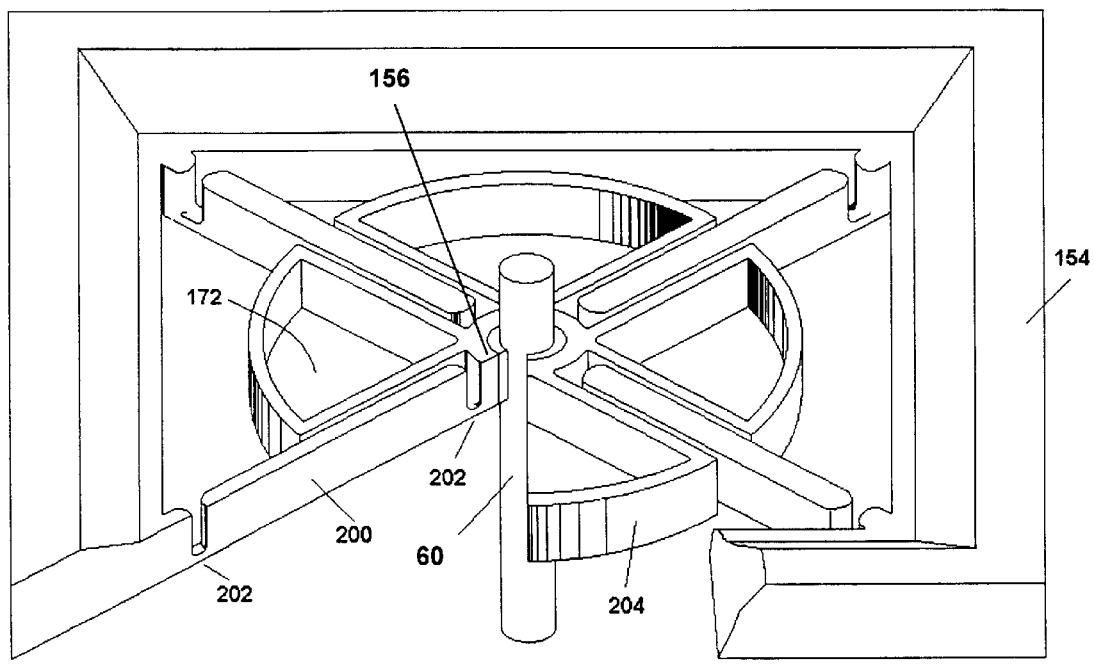
FIG. 20 is a three-dimensional view of the suspension shown illustrated in FIG. 18(d).

The suspension of FIG. 18(e) is a variation of moveable part 156 suspension and is illustrated three-dimensionally in FIG. 20. In the FIG. 18(e) embodiment, moveable part 156 is a cylinder 204 with beams 200, FIG. 20. Beams 200 can optionally have thinner sections 202. These thinner sections 202 can be used as a concentrator of mechanical stress for increasing sensitivity of the sensors positioned on beams 200. The cylindrical shape 204 has several advantages including, (i) permitting electrodes 172 to be more rigid so they can transfer their motion to the angular motion of fiber 60 more accurate and (ii) does not increase the mass of the movable part because cylinder 204 is hollow. The sidewall of cylinder 204 can also be used as an additional surface for electrode 172 to increasing sensitivity/efficiency of actuator 76. Actuator plate 178 can also be expanded on the internal cylindrical part 206 as shown in FIG. 18(e). When electrostatic voltage is applied to plate 178, it is also applied to electrode 206 that is electrically coupled to plate 178. The electrostatic force acts between plate 178 and electrode 172 and also between plate 206 and moveable surface of cylinder 204. The result is an increase of the electrostatic force and a decrease in the required voltage required to tilt electrode 172 and optical body 42 to the same angle.

Figure 21:
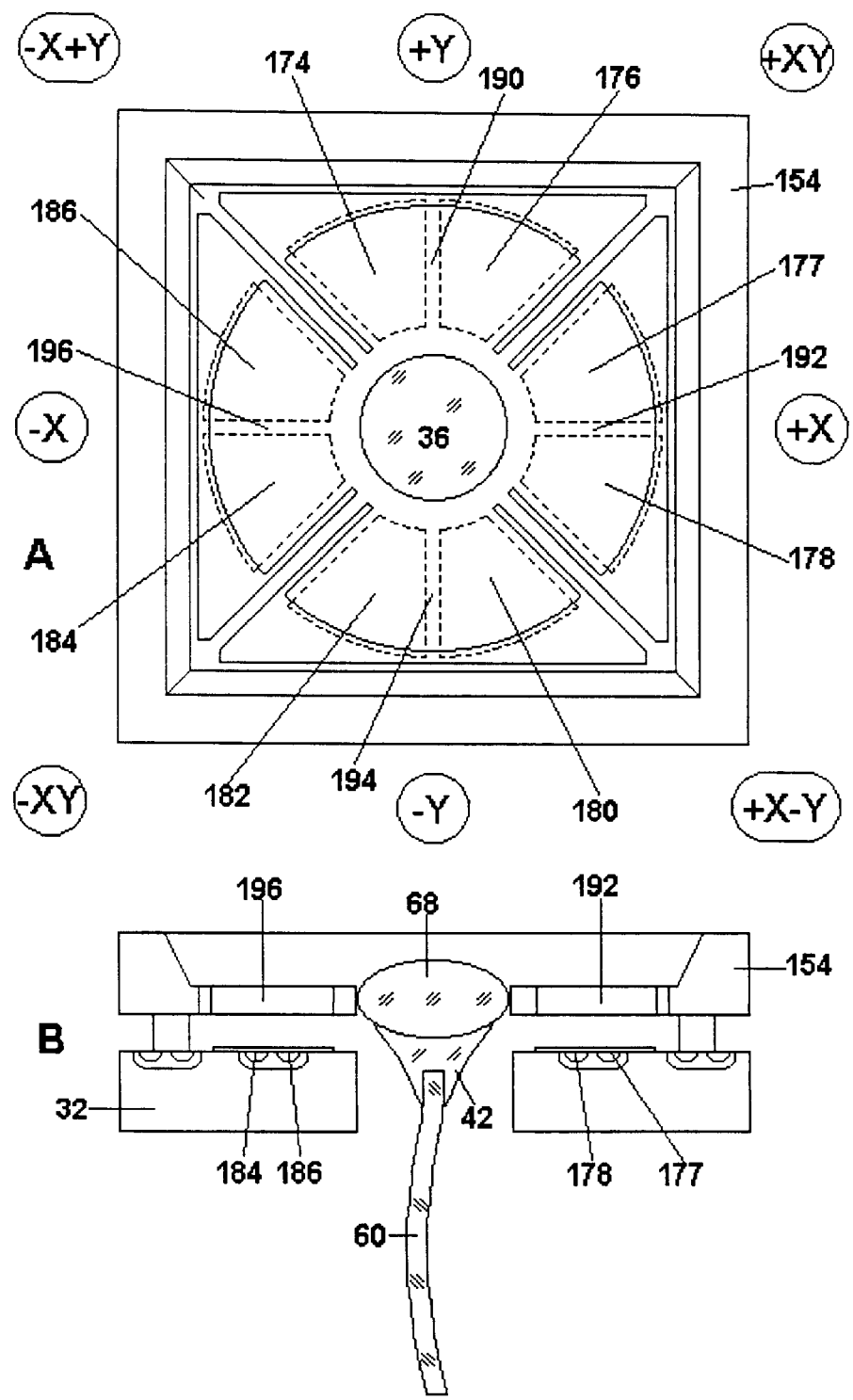
FIG. 21(a) illustrates an example of electrostatic actuation of the optical switch with eight electrodes for eight angular positions of the movable part of the actuator.
FIG. 21(b) is a cross section view of FIG. 21(a) electrostatic actuation of the optical switch.

FIGS. 21(a)–(b) illustrates an embodiment of electrostatic actuation of optical switch 30 for eight angular positions. For example, when the voltage is applied on steady electrodes 174 and 176, then moveable plate 190 moves toward the +Y direction. When the voltage is applied on the plates, for example, 182 and 180, then moveable plate 194 is attracted to the base and moves toward the −Y direction. Correspondingly, when the voltage is applied to 176 and 177, then the entire moveable part 156 is tilt toward the +XY direction. Thus, changing the combination of the voltage applied to different electrodes can change the angle or positions of lens 68 and the outgoing light beam. In provides discrete or digital positioning of the light beam.

FIGS. 22(a)–22(f) illustrates another suspension embodiment where fiber 208 serves as a suspension for moveable part 156. In this embodiment, moveable part 156 has a circular disk that is fixed on the end of fiber 208.

Figure 22:
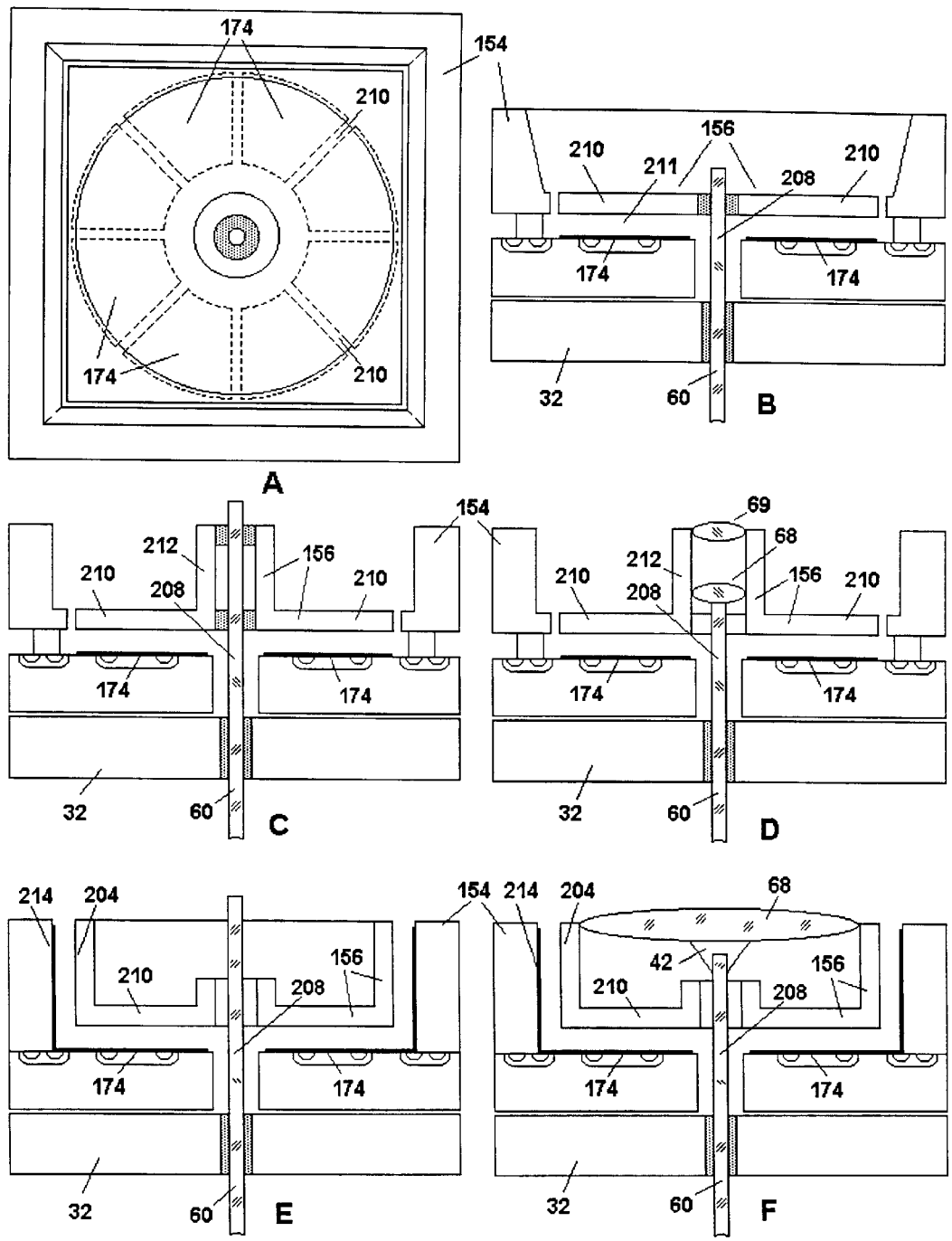
FIG. 22(a) is a top view of an actuator useful in making a mushroom like suspension for use with the present invention.
FIG. 22(b) is a cross sectional view of an actuator with a flat mushroom hat for use with the present invention.
FIG. 22(c) is a cross sectional view of an actuator with a fiber that extends over the FIG. 22(b) mushroom hat.
FIG. 22(d) is a cross sectional view of an actuator with lens system on the top of the FIG. 22(b) mushroom hat.
FIG. 22(e) is a cross sectional view of an actuator with an additional cylindrical surface on the top of the FIG. 22(b) mushroom hat
FIG. 22(f) is a cross sectional view of an actuator with an additional cylinder and lens on the top of the FIG. 22(b) mushroom hat.

FIG. 22(a) shows a top view of one transmitting or receiving cell that includes frame 154 and moveable plate 210 fixed at the end of fiber 208. Moveable plate 210 is at a distance 211 away from electrodes 174 as shown in FIG. 22(b).

Electrodes 174 can be sectors of a circle. In a neutral position, when the voltage is not applied to any of the electrodes 174, moveable plate 210 stays in the neutral position, see FIG. 22(b) and the light exits from fiber 208 in a straight upward direction.

When the voltage is applied to one of the electrodes 174, then moveable plate 210 bends toward this electrode 174 because of the electrostatic force applied to this capacitor. This force tilts moveable plate 210 and deflects the end of fiber 208 to redirecting the light beam.

FIG. 22(c) illustrates the same cross section of the same kind of redirecting mechanism with the only difference being that the central part of moveable plate 210 is a cylinder 212 which allows to extend the end of fiber 208 to extend above moving plate 210. This embodiment produces larger linear deflections at the end of fiber 208 with the same angular deflection of the fiber 208 in the area that serves as a suspension of the whole redirecting mechanism.

FIG. 22(d) illustrates, in cross-section, the redirecting mechanism, which can further include micro-lenses 68 and 69 incorporated in cylindrical micro-collimator 212 of moveable plate 210. Lenses 68 and 69 provide focusing or collimation.

The redirecting mechanism illustrated in FIG. 22(e) has a cylindrical moving plate similar to that of FIG. 18(e). In this embodiment, the suspension is also fiber 208 itself. When voltage is applied to electrode 174 then the electrostatic force between electrode 174 and moveable plate 210 attracts moveable plate 210 toward electrode 174.

An additional electrode 214, positioned on an interior of frame 154, also serves as an electrode for the electrostatic actuator. The additional electrostatic force between electrode 214 and cylinder 204 attracts this side of the cylinder toward electrode 214. This increases the efficiency of actuator 76 by increasing deflection or angle or tilt of moveable plate 210 for the same driving voltage applied to electrodes 174 and 214, or decreases the required voltage for the same deflection of fiber 208.

The redirecting mechanism of FIG. 22(f) is a variation the FIG. 22(e) embodiment. In FIG. 22(f) lens 68 is fixed at the end of cylinder 204, creating a micro-collimator that is integrated with the movable part 156 of actuator 76.

FIGS. 23(a)–23(f) illustrate different embodiments of light redirecting mechanisms of the present invention.

Figure 23:
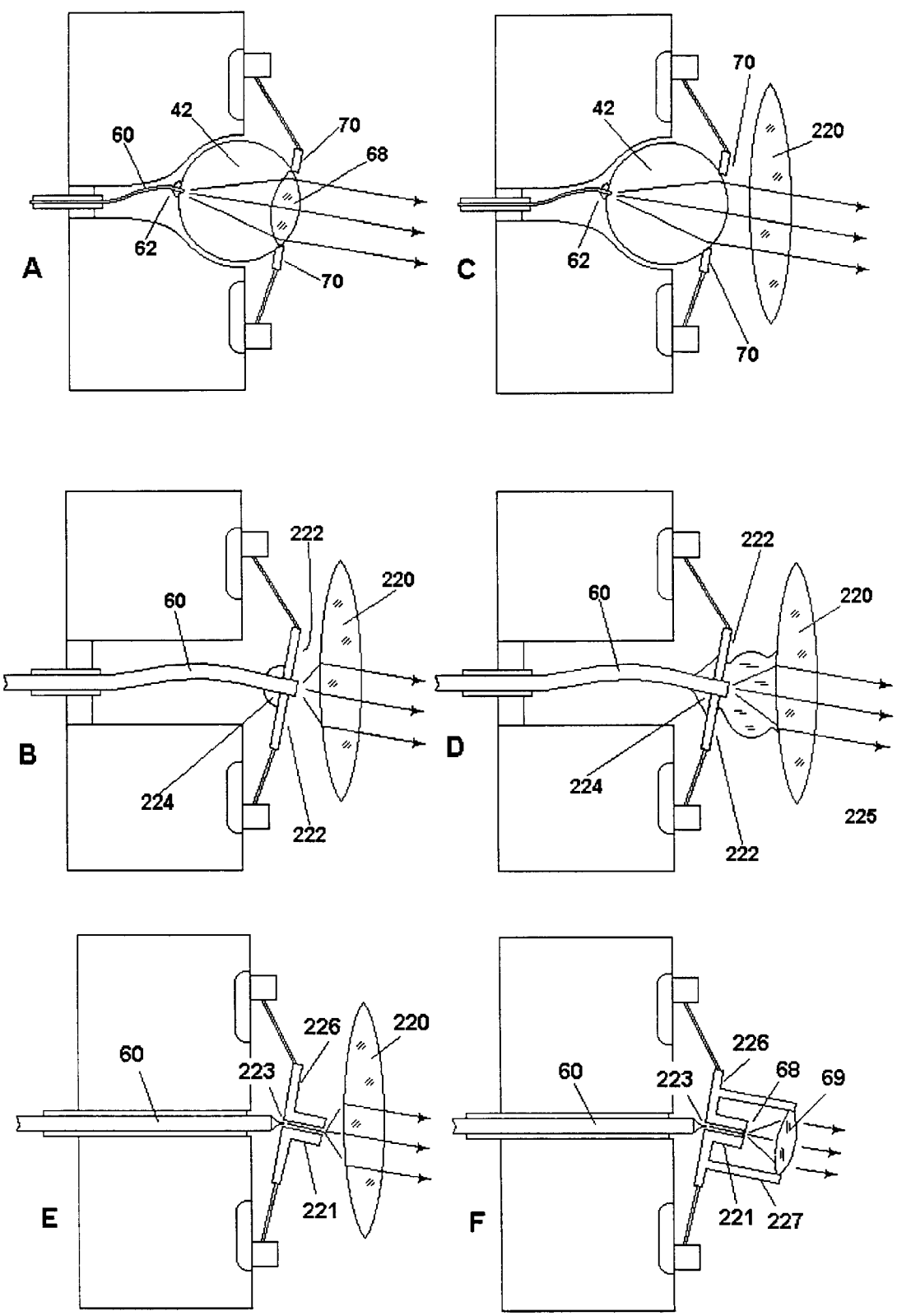
FIGS. 23(a)-(f) illustrate different embodiments of the light redirecting devices of the present invention.

FIG. 23(a) illustrates redirection of light with fiber 223, optical body 42 and lens 68 rotating or moving the light beam out of transmitting array 32. In some cases, one lens 68 cannot provide quality light beam collimating and additional lens are required. The system of lens and micro-lenses can be moveable together in optical body 42.

In FIG. 23(b), an additional lens 220 is provided that is not moveable. Lens 220 serves as an additional focusing or collimating lens and transmits the redirected beam.

In FIG. 23(c), the end of fiber 223 has its own collimating or focusing micro-lens. The end of fiber 223 is preferably positioned at a distance to lens 220 that is selected in order for the beam exiting fiber 223 is collected by lens 220. The end of fiber 223 is redirected with the assistance of moveable part 222 which also redirects the light beam. This embodiment enables optical body 42 to be lightweight and requires only a small redirection. Optical losses experienced in the FIG. 23(c) embodiment can be resolved in the FIG. 23(d) embodiment where the gap between the end of fiber 223 and lens 220 is filled with an optically transparent material 225. Optically transparent material 225 does not prevent free movement of the end of fiber 223 and provides an optical matching of fiber 223 with lens 220 in order to decrease optical losses.

Referring now to FIG. 23(e), fiber 223 is stationary and can include its own micro-lens or micro-collimating system. A distal end of fiber 223 is located at an input of waveguide 221. Waveguide 221 is mechanically coupled to movable part 226 of actuator 76. The mechanical system of angular rotation of waveguide 221 is made in such a way that the pivot point is located close to the distal end of fiber 223. As a result, with angular redirection of waveguide 221 the input of waveguide 221 is always optically coupled with the distal end of fiber 223. The light beam exiting fiber 223 enters waveguide 221. Waveguide 221 then redirects the beam toward the corresponding receiving array 36. This embodiment has the advantage that there is no need to move and bend fiber 223. The overall suspension of movable part 156, including the suspension and along with the springy properties of fiber 223, is more flexible and requires less driving voltage for a selected tilt. This embodiment is also advantageous because of its simplification in the assembling process.

Waveguide 221 can also be combined with micro-collimating system 227 as illustrated in FIG. 23(f). Micro-collimator system 227 is mechanically and optically coupled with movable part 156 and waveguide 221. Micro-collimator 227 can include several lenses 68, 69 for better control of the beam shape.

Figure 24:
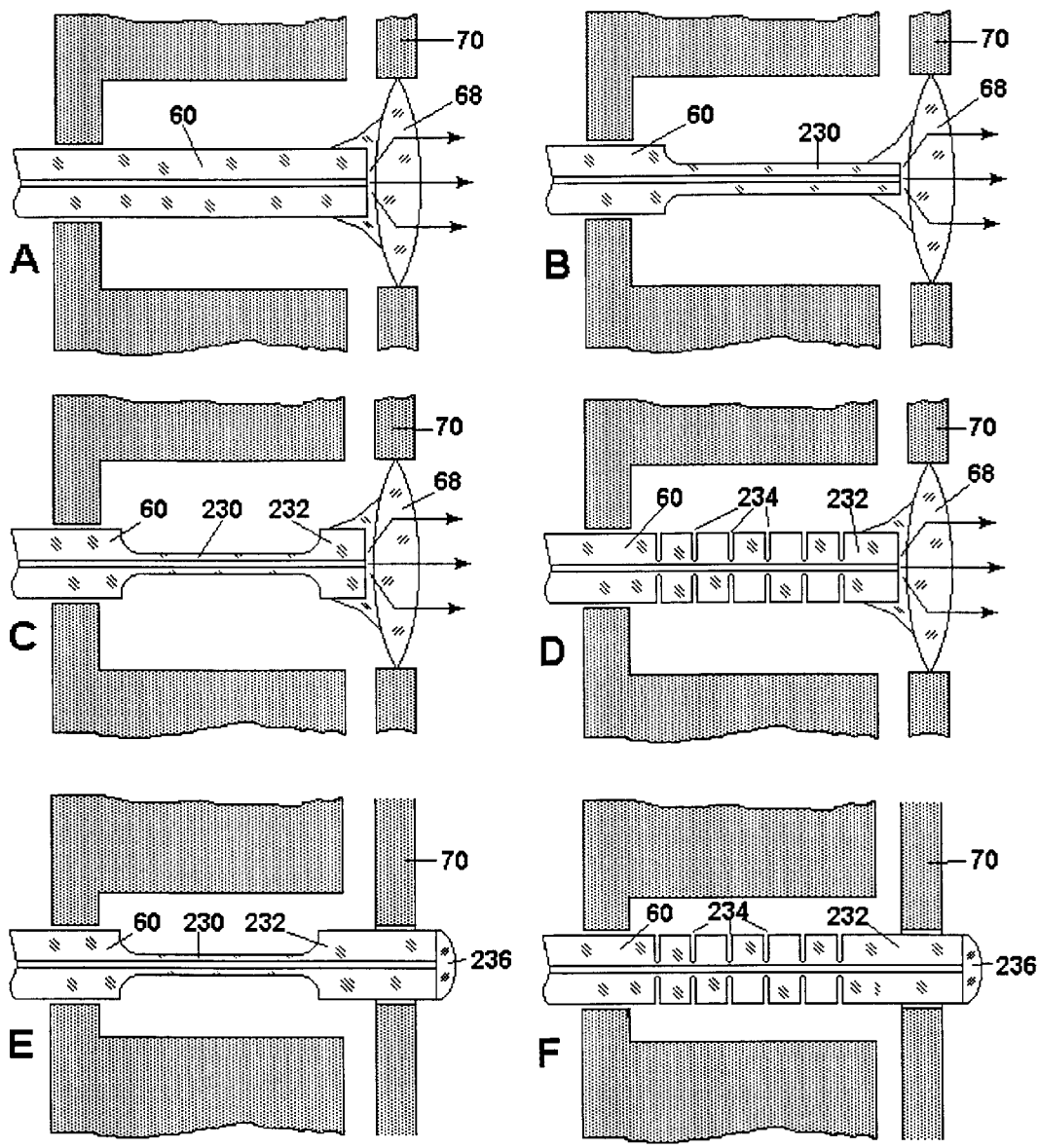
FIGS. 24(a)-(f) illustrate different embodiments of the moveable parts of the fiber useful with the present invention.

FIGS. 24(a)–(f) illustrates different versions of moveable part 156 of fiber 223. When fiber 223 is used as a suspension, then the entire thickness can be used as in FIG. 24(a). In this embodiment, the end of fiber 223 is coupled optically and mechanically with lens 68 and moveable part 156. When the mechanical suspension other than fiber 223 itself is used, then the flexibility of the end of fiber 223 can be critical. In this embodiment, the end of fiber 223 can be thinned as shown in FIG. 24(b). The end of fiber 230 can be thinner than its initial cladding. This thinner fiber 230 provides more flexibility, ability to bend, and is connected to lens 68 and moveable part 156.

In FIG. 24(c) fiber 223 is again thinned from its initial cladding except the very distal end of fiber 223 is thinker. This enhances the mechanical coupling with lens 68.

In another embodiment, illustrated in FIG. 24(d), circular or other geometric trenches 234 are made at the end of fiber 223. This structure provides enough flexibility for the end of fiber 223 to be bent and while preventing the maximum curvature, maximum bending, of fiber 223 and reduces the possible optical losses. The geometry of trenches 234 and their pitch can be designed in such a way that the maximum bending of fiber 223 does not exceed the maximum allowable bending for a required level of optical loss.

FIG. 24(e) illustrates another embodiment of the end of fiber 223. In this embodiment, lens 236 is bonded or sealed directly to fiber 223, or made from the fiber material. Moveable part 156 is connected directly to the end of fiber 223. The flexible part of fiber 223 has a smaller diameter than the diameter of its cladding. Additionally, as in FIG. 24(f), lens 236, for example a GRIN lens and the like, is attached directly to fiber 231 and moveable part 156 is also bonded directly to the end of fiber 231.

Figure 25:
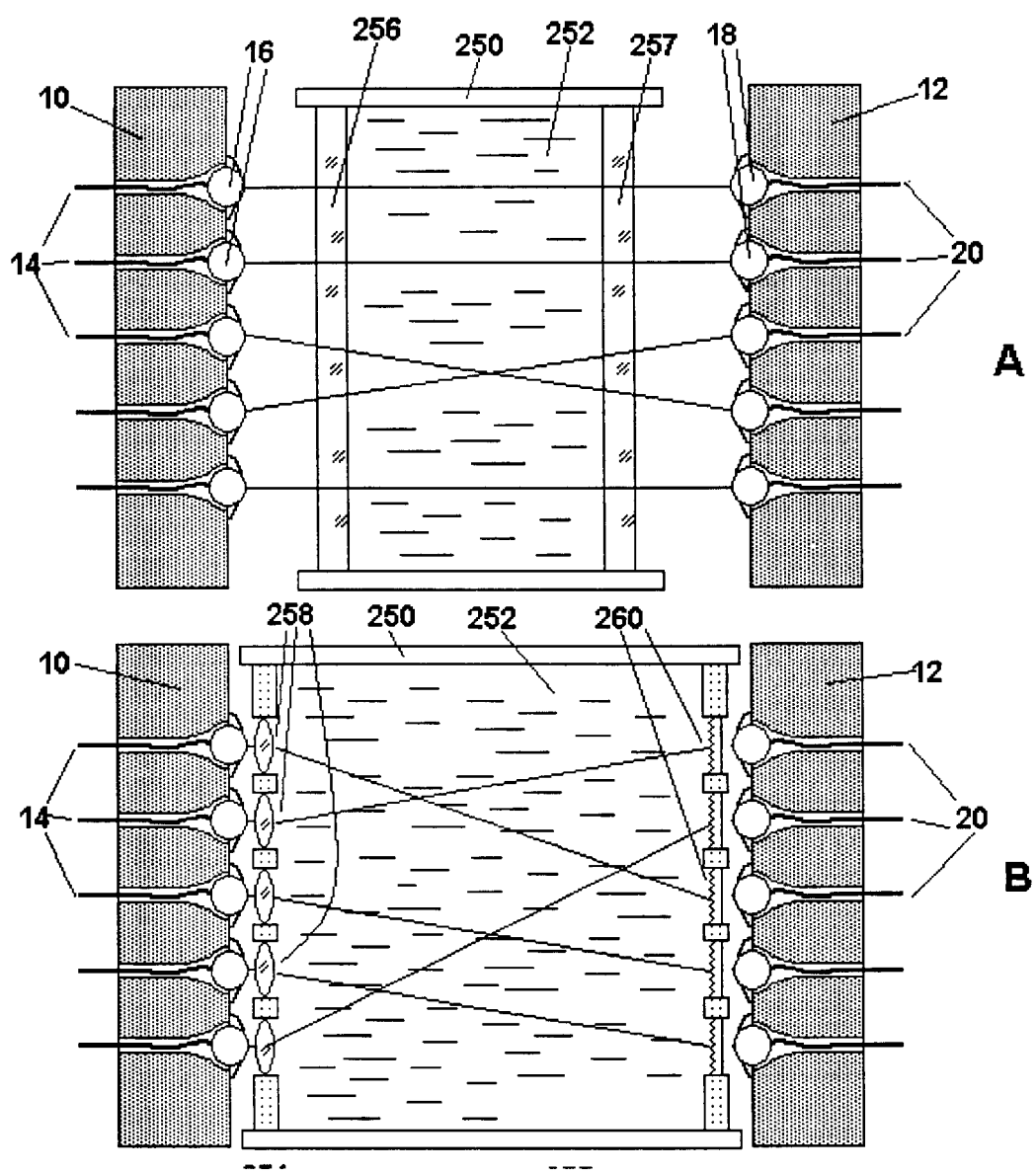
FIGS. 25(a)-(b) illustrate different embodiments of optically transparent media that can be employed with the present invention.

FIGS. 25(a)–25(b) illustrate different embodiments of optically transparent media between transmitting array 32 and receiving array 36. The optically transparent media can be vacuum, gas, air, liquid, gel, and the like. In FIG. 25(a) optically transparent media is housed in a closed volume 250 filled with optically transparent material 252. Closed volume 250 has at least two transparent windows 256 and 257 which allow transmitted light beams to travel from transmitting array 32 to receiving arrays 36.

Referring now to FIG. 25(b), closed volume 250 has multiple sets of windows 258 and 260 for every transmitting and receiving arrays 32 and 36. Windows 258 and 260 can be optical grating lenses.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical switch, comprising:
   a plurality of transmitting devices including a plurality of optical fibers each with a distal end;
   a plurality of focusing devices, each of a distal end of a fiber coupled to at least one focusing device;
   a plurality of receiving devices; and
   wherein at least a portion of distal ends of the optical fibers move in three orthogonal and at least two angular dimensions to direct output beams from the plurality of transmitting devices to the plurality of receiving devices.

2. The switch of claim 1, wherein the plurality of transmitting devices are integrated on a single substrate.

3. The switch of claim 1, wherein the plurality of receiving devices are integrated on a single substrate.

4. The switch of claim 1, wherein the plurality of transmitting devices includes a plurality of focusing devices, each of an optical fiber from the plurality of transmitting devices being coupled to at least one focusing device.

5. The switch of claim 4, wherein each focusing device includes at least one lens.

6. The switch of claim 5, wherein each lens is selected from a regular lens, a GRIN lens, a diffractive grated lens, and a Fresnel lens.

7. The switch of claim 4, wherein at least a portion of the focusing devices include a micro-collimator.

8. The switch of claim 4, wherein at least a portion of the focusing devices include an optical waveguide.

9. The switch of claim 4, wherein at least a portion of the focusing devices include a variable-focus lens.

10. The switch of claim 4, further comprising:
an optical body positioned between each focusing device and a distal end of each of a optical fiber of the plurality of transmitting optical fibers.

11. The switch of claim 10, wherein the optical body includes at least one of a solid optical transparent material, a liquid optically transparent material, a gaseous optically transparent material, a gel optically transparent material.

12. The switch of claim 4, wherein at least a portion of focusing devices are MEMS devices.

13. The switch of claim 1, wherein the plurality of transmitting devices includes a plurality of directing devices, each of an optical fiber of the plurality of transmitting devices being coupled to at least one directing device.

14. The switch of claim 13, wherein each directing device is a micro-mechanical device.

15. The switch of claim 14, wherein each micro-mechanical device includes an actuator.

16. The switch of claim 15, wherein each actuator is selected from an electro-static actuator, an electromagnetic actuator, a piezoelectric actuator, a thermo-mechanical actuator and a polymer actuator.

17. The switch of claim 16, wherein the polymer actuator is an electro-active polymer actuator, an optical-active polymer actuator, a chemically active polymer actuator, a magneto-active polymer actuator, an acousto-active polymer actuator and a thermally active polymer actuator.

18. The switch of claim 14, wherein each micro-mechanical device includes a suspension member that provides movement of a distal portion of an optical fiber of the plurality of transmitting optical fibers.

19. The switch of claim 18, wherein each suspension member includes at least one elastic deformation member that provides a mechanical coupling between a substrate and the movable part of the directing device.

20. The switch of claim 13, wherein at least a portion of the directing devices include an optical waveguide.

21. The switch of claim 13, wherein at least a portion of directing devices are MEMS devices.

22. The switch of claim 1, wherein the plurality of transmitting devices includes a plurality of focusing devices and a plurality of directing devices, wherein each of a focusing device is coupled to a directing device.

23. The switch of claim 1, wherein at least a portion of the receiving devices are directed to receive the transmitter output beams from the plurality of transmitting devices while simultaneously focusing the incoming beams into the plurality of optical fibers of the plurality of receiving devices.

24. The switch of claim 1, wherein the plurality of receiving devices includes a plurality of focusing devices, each of an optical fiber of a plurality of receiving optical devices being coupled to at least one focusing device.

25. The switch of claim 24, wherein each focusing device includes at least one lens.

26. The switch of claim 25, wherein each lens is selected from a regular lens, a GRIN lens, a diffractive grated lens, and a Fresnel lens.

27. The switch of claim 25, wherein at least a portion of lenses are MEMS devices.

28. The switch of claim 24, wherein at least a portion of focusing devices include a micro-collimator.

29. The switch of claim 24, wherein at least a portion of the focusing devices include an optical waveguide.

30. The switch of claim 24, wherein at least a portion of focusing devices include a variable-focus lenses.

31. The switch of claim 24, further comprising:
an optical body positioned between each focusing device and a distal end of each optical fiber of the plurality of receiving devices.

32. The switch of claim 31, wherein the optical body includes at least one of a solid optical transparent material, a liquid optically transparent material, a gaseous optically transparent material, a gel optically transparent material.

33. The switch of claim 24, wherein at least a portion of focusing devices are MEMS devices.

34. The switch of claim 1, wherein the plurality of receiving devices includes a plurality of directing devices, each of an optical fiber of a plurality of receiving optical devices being coupled to at least one directing device.

35. The switch of claim 34, wherein each directing device is an micro-mechanical device.

36. The switch of claim 35, wherein each micro-mechanical device includes an actuator.

37. The switch of claim 36, wherein each actuator is selected from an electro-static actuator, an electromagnetic actuator, a piezoelectric actuator, a thermo-mechanical actuator and a polymer actuator.

38. The switch of claim 37, wherein the polymer actuator is an electro-active polymer actuator, an optical-active polymer actuator, a chemically active polymer actuator, a magneto-active polymer actuator, an acousto-active polymer actuator and a thermally active polymer actuator.

39. The switch of claim 35, wherein each micro-mechanical device includes a suspension member that provides movement of a distal portion of a transmitting optical fiber of the plurality of transmitting optical fibers.

40. The switch of claim 39, wherein each suspension member includes at least one elastic deformation member that provides a mechanical coupling between a substrate and at least a portion of each micro-mechanical device.

41. The switch of claim 34, wherein at least a portion of the directing devices include an optical waveguide.

42. The switch of claim 34, wherein at least a portion of directing devices are MEMS devices.

43. The switch of claim 1, wherein the plurality of receiving devices includes a plurality of focusing devices and a plurality of directing devices, wherein each of a focusing device is coupled to a directing device.

44. The switch of claim 1, wherein at least a portion of transmitting devices are MEMS devices.

45. The switch of claim 1, wherein each of a transmitting device includes a fiber placement cavity.

46. The switch of claim 1, further comprising at least one transmitter substrate with a plurality of fiber placement cavities, each of a fiber placement cavity corresponding to a transmitting device of the plurality of transmitting devices.

47. The switch of claim 46, wherein each of a transmitter device includes a focusing device and a directing device at least partially positioned in a fiber placement cavity.

48. The switch of claim 47, wherein each of a receiver device includes a focusing devices and a directing device at least partially positioned in a fiber placement cavity.

49. The switch of claim 48, wherein each directing device includes a suspension member that provides movement of a distal portion of a transmitting or receiving optical fiber.

50. The switch of claim 49, wherein at least a portion of the receiving devices are directed to receive the transmitter output beams from the plurality of transmitting devices while simultaneously focusing the incoming beams into the plurality of optical fibers of the plurality of receiving devices.

51. The switch of claim 46, further comprising at least one receiver substrate with a plurality of fiber placement cavities, each of a fiber placement cavity corresponding to a receiving device of the plurality of receiving devices.

52. The switch of claim 51, wherein each of a transmitter device includes a focusing device and a directing device positioned adjacent to a fiber placement cavity.

53. The switch of claim 52, wherein each of a receiver device includes a focusing device and a directing device positioned adjacent to a fiber placement cavity.

54. The switch of claim 53, wherein each directing device includes a suspension member that provides movement of a distal portion of a transmitting or receiving optical fiber.

55. The switch of claim 1, further comprising:
   a first substrate coupled to the plurality of transmitting devices that include a plurality of transmitting optical fibers, a plurality of focusing members and a plurality of directing members;
   a second substrate coupled to the plurality of receiving devices that include a plurality of receiving optical fibers, a plurality of focusing members and a plurality of directing members.

56. The switch of claim 55, wherein the first and second substrates each include a plurality of fiber placement cavities.

57. The switch of claim 56, wherein a cross-sectional dimension of a fiber placement cavity is greater than the size of the components positioned in the cavity.

58. The switch of claim 55, wherein the plurality of transmitting devices includes a plurality of elastic deformation members that provide a mechanical coupling between the first substrate and a movable parts of directing devices.

59. The switch of claim 55, wherein the plurality of receiving devices includes a plurality of elastic deformation members that provide a mechanical coupling between the second substrate and a movable parts of directing devices.

60. The switch of claim 1, further comprising
   an optically transparent media between transmitting and receiving devices where light beams from said transmitting devices can mutually intersect on their way to corresponding receiving devices.

61. The switch of claim 60, wherein the optically transparent media includes a vacuum, a solid optically transparent material, a liquid optically transparent material, a gaseous optically transparent material, a gel optically transparent material.

62. The switch of claim 60, wherein optically transparent media is a system of lenses between transmitting and receiving devices.

63. The switch of claim 62, wherein each lens is selected from a regular lens, a GRIN lens, a diffractive grated lens, and a Fresnel lens.

64. The switch of claim 1, wherein a number of transmitting devices and a number of receiving devices are the same.

65. The switch of claim 1, further comprising:
   a control system coupled to the plurality of transmitting devices and plurality of receiving devices, the control system providing control signals that coordinate positioning of transmitting devices and receiving devices.

66. The switch of claim 1, further comprising:
   at least one sensor coupled to the plurality of transmitting devices and the control system; and
   at least one sensor coupled to the plurality of receiving devices and the control system;

67. The switch of claim 66, wherein each of the plurality of transmitting and receiving devices includes at least one photosensitive sensor; and
   moving at least a portion of the distal ends of the optical fibers in three orthogonal and at least two angular dimensions to direct output beams from the plurality of transmitting devices to the plurality of receiving devices.

68. A method for optical switching between input fiber channels output fiber channels comprising:
   providing a plurality of transmitting devices including a plurality of optical fibers and a plurality of receiving devices including a plurality of optical fibers; and
   moving at least a portion of the distal ends of the optical fibers in three orthogonal and at least two angular dimensions to direct output beams from the plurality of transmitting devices to the plurality of receiving devices.

* * * * *